United States Patent
Kim et al.

(10) Patent No.: US 11,603,966 B2
(45) Date of Patent: Mar. 14, 2023

(54) DEVICE FOR AUTOMATICALLY OPENING/CLOSING GAS BARREL VALVE AND METHOD THEREFOR

(71) Applicant: AMT CO., LTD., Asan-si (KR)

(72) Inventors: Du Chul Kim, Cheonan-si (KR); Jong Seong Lee, Cheonan-si (KR); Won Ho Choi, Cheonan-si (KR)

(73) Assignee: AMT CO., LTD., Asan-si (KR)

( * ) Notice: Subject to any disclaimer, the term of this patent is extended or adjusted under 35 U.S.C. 154(b) by 0 days.

(21) Appl. No.: 17/536,903

(22) Filed: Nov. 29, 2021

(65) Prior Publication Data

US 2022/0090740 A1    Mar. 24, 2022

Related U.S. Application Data

(62) Division of application No. 16/633,422, filed as application No. PCT/KR2018/008812 on Aug. 2, 2018, now Pat. No. 11,378,232.

(30) Foreign Application Priority Data

Aug. 2, 2017 (KR) .................. 10-2017-0097984
Jul. 6, 2018 (KR) .................. 10-2018-0078901

(51) Int. Cl.
*F17C 13/04* (2006.01)
*F16K 21/04* (2006.01)
*F17C 13/02* (2006.01)

(52) U.S. Cl.
CPC .............. *F17C 13/04* (2013.01); *F16K 21/04* (2013.01); *F17C 13/02* (2013.01);
(Continued)

(58) Field of Classification Search
CPC .............. F17C 13/04; F17C 2205/0111; F17C 2205/0326
See application file for complete search history.

(56) References Cited

U.S. PATENT DOCUMENTS

2010/0319804 A1\* 12/2010 Moretti .................. F17C 13/04
 141/192
2019/0128205 A1\* 5/2019 Eckerdal ............... F17C 13/002

FOREIGN PATENT DOCUMENTS

JP    H06-265100 A    9/1994
JP    H07-190298 A    7/1995
(Continued)

OTHER PUBLICATIONS

International Search Report for PCT/KR2018/008812 dated Dec. 6, 2018 from Korean Intellectual Property Office.

*Primary Examiner* — Paul J Gray
(74) *Attorney, Agent, or Firm* — Paratus Law Group, PLLC

(57) ABSTRACT

A method for automatically opening or closing a gas barrel valve, includes: loading and aligning a gas barrel in a cabinet; separating an end cap from the gas barrel; screw-coupling a connector holder to a gas spray nozzle, from which the ends cap has been removed; winding a spring around a first shaft by enabling forward rotation of the first shaft while suppressing reverse rotation of the first shaft, which is installed in a valve handle holder so as to idle; opening a valve by enabling reverse rotation of a valve handle of the gas barrel while preventing forward rotation of the valve handle holder; and automatically closing the valve at the time of replacement of the gas barrel or when a gas leak is detected.

7 Claims, 24 Drawing Sheets

(52) U.S. Cl.
CPC ............ *F17C 2205/0111* (2013.01); *F17C 2205/0326* (2013.01); *F17C 2250/0636* (2013.01); *F17C 2260/04* (2013.01)

(56) References Cited

FOREIGN PATENT DOCUMENTS

| | | |
|---|---|---|
| JP | 2010-038238 A | 2/2010 |
| KR | 10-1996-008711 B1 | 6/1996 |
| KR | 10-0242982 B1 | 2/2000 |
| KR | 10-0649112 B1 | 11/2006 |
| KR | 10-0985575 B1 | 10/2010 |
| KR | 10-2015-0086151 A | 7/2015 |

\* cited by examiner

DEVICE FOR AUTOMATICALLY OPENING/CLOSING GAS BARREL VALVE AND METHOD THEREFOR

CROSS-REFERENCE TO PRIOR APPLICATIONS

This Application is Divisional Application of a U.S. patent application Ser. No. 16/633,422 (filed on Jan. 23, 2020), which is a National Stage Patent Application of PCT International Patent Application No. PCT/KR2018/008812 (filed on Aug. 2, 2018), which claims priority to Korean Patent Application Nos. 10-2017-0097984 (filed on Aug. 2, 2017) and 10-2018-0078901 (filed on Jul. 6, 2018), which are all hereby incorporated by reference in their entirety.

BACKGROUND

The present invention relates to a device for automatically opening/closing a gas barrel valve so that a gas barrel loaded on a cabinet is automatically connected to a gas supply line, and a method therefor and, more specifically, to a device for automatically opening/closing a gas barrel valve, in which when a gas leak occurs in the process of separating an end cap from the gas barrel loaded on the cabinet, connecting the gas barrel to the gas supply line, and then opening a valve handle so as to supply gas from the inside of the gas barrel through the gas supply line, the opened gas spray nozzle can be automatically closed quickly not only when power is supplied normally but also during a power outage.

In general, in the semiconductor fabrication process, various kinds of gases are supplied and utilized according to the use, and most of these gases, if inhaled by humans or exposed to the air, cause great damage such as safety accidents, environmental pollution, and the like.

For example, hazardous gases such as arsenic hydride (AsH3: Arsine), hydrogen phosphide (PH3: Phosphine) or boron trifluoride (BF3) may be used as the type of gas used in the ion implantation process. Since these gases are highly toxic and cause serious effects when workers inhale these gases into the respiratory tract, these gases must be carefully managed to ensure no leakage during the supply to the production line.

The management of the gases used in the semiconductor fabrication process is very important. The gases are charged to gas barrels at high pressure and the gas barrels are mounted in a cabinet so that the gases are supplied to the production line through gas supply lines. When about 90% of these gases are exhausted, workers replace them with new gas barrels so that foreign matters remaining in the gas barrels are not supplied to the wafer processing process.

FIG. 1 is a perspective view showing a prior art gas barrel, in which a prior art gas barrel 200 for semiconductor fabrication includes a container body 210, a container neck 230, a gas spray nozzle 250, an end cap 290 and a main valve 270.

The container body 210 is cylindrical so that gas to be supplied to the semiconductor fabrication process is filled and stored therein, and the container neck 230 is a portion extending from one end portion of the container body 210 by a predetermined length and has a pipe shape so as to serve as a gate so that the gas is discharged from the container body 210 therethrough.

In addition, the gas spray nozzle 250 has a pipe shape like container neck 230 and has one end portion mounted to the container neck 230 that is connected to the container body 210, wherein the container neck is arbitrarily connected to an external gas line (not illustrated).

Furthermore, the end cap 290 has a lid shape and is mounted on the other end portion of the gas spray nozzle 250, that is, the portion where the gas spray nozzle 250 is connected to an external gas line so as to serve to seal the gas spray nozzle 250.

The valve handle 270 has a "T" shape and is mounted on the portion where the gas spray nozzle 250 and the container neck 230 are connected so as to serve to open the gas spray nozzle 250 and to control the flow of the gas when the gas is discharged from the container body 210.

The prior art gas barrel 200 configured as described above is replaced by a worker whenever the gas filled in the container body 210 is exhausted and, in this case, the worker must first separate the gas barrel 200 from which the gas is exhausted from the external gas line.

After that, the replacement of the gas barrel is completed by the worker by preparing a new gas barrel, removing the end cap mounted on the gas spray nozzle of the new gas barrel, connecting the new gas barrel to the external gas line, and then opening the valve handle closing the gas spray nozzle.

FIG. 2 is a perspective view schematically showing a prior art gas supply device of a semiconductor device, in which in order to place a plurality of gas barrels (not illustrated) each filled with process gases such as SiH4, PH3, NF3, CF4, etc. required by various equipment 8 in a FAB 7, a cabinet 1 is positioned at a predetermined position outside the FAB 7 and a duct 4 is installed at one side of the cabinet 1 so as to guide gas supply lines 3 respectively connected to the gas barrels 2.

In order to supply the process gas introduced along the gas supply line 3, regulator boxes 5 are provided at the other side of the duct 4 in a number corresponding to the number of the gas barrels and the upper end portions of the respective regulator boxes 5 are connected to the same number of supply pipes 9 as the number of the equipment 8 so that the supply pipes 9 can be connected correspondingly to the equipment 8 in the FAB 7.

Therefore, when the process gas is supplied from each of the gas barrels placed in the cabinet 1, each process gas is introduced into each regulator box 5 along the gas supply line 3 passing through the inside of the duct 4.

Thereafter, each process gas introduced into each regulator box 5 is purified through a filter (not shown) and then supplied by flowing along each of the supply pipes 9, which are branched into a number corresponding to that of the equipment 8 in the FAB 7 so as to be connected to the equipment 8 in the FAB 7, so that wafers can be processed.

[Prior Art Documents]

[Patent Document 0001] Korean Reg. Patent Publication No. 10-0242982 (Reg. on 15 Nov. 1998)

[Patent Document 0002] Korean Reg. Patent Publication No. 10-0649112 (Reg. on 16 Nov. 2006)

[Patent Document 0003] Korean Reg. Patent Publication No. 10-0985575 (Reg. on 29 Sep. 2010)

SUMMARY

However, this prior art gas supply device has a number of problems as follows.

First, human errors have been generated according to the skill of workers because the workers have manually replaced the gas barrels stored in the cabinet whenever gas has been exhausted.

Second, in the event of a gas leak due to a contingency such as an earthquake during gas supply through the gas supply line, no means of automatically shutting off the valve of a gas barrel have been devised, resulting in a fatal defect in which the gas leak results in an explosion or workers become addicted to the gas.

Third, since the end cap is manually opened/closed by a worker, after the end cap is removed, the end cap should be stored in a predetermined place and then screw-coupled again when the gas spray nozzle is to be closed due to the replacement of a gas barrel. However, the end cap could not be screw-coupled quickly when the gas barrel was replaced because the storage location of the end cap was not constant.

Even if the end cap is stored in a predetermined place, since a worker closes the gas spray nozzle by hand, there is a possibility that a human error may occur due to an operation mistake, which is vulnerable to a safety accident.

The present invention has been derived to solve such a problem in the prior art and has an objective of enabling automatic replacement of a gas barrel by automatically connecting a gas barrel loaded and aligned in a cabinet to a gas supply line.

Another objective of the present invention is to fundamentally solve safety accidents due to a gas leak by automatically closing the valve handle of a gas barrel in the case of a power outage or a gas leak due to sudden vibration, earthquake, or the like in a state, in which the gas spray nozzle of the gas barrel is opened.

Still another objective of the present invention is to automatically shut off the gas spray nozzle of a gas barrel even if an earthquake or a power outage occurs in the process of opening the gas spray nozzle by rotating a valve handle, by winding a spring first such that the valve handle is automatically closed before opening the gas spray nozzle of the gas barrel.

A further objective of the present invention is to manually close or open the gas spray nozzle of a gas barrel by manually rotating a handle valve holder for rotating the valve handle of the gas barrel in an emergency.

A still further objective of the present invention is to securely store, in an end cap holder, an end cap, which has been automatically separated from a gas barrel positioned in a cabinet and automatically close a gas spray nozzle with the end cap stored in the end cap holder when the time to replace the gas barrel is detected.

According to one aspect of the present invention in order to achieve the objectives, there is provided a device for automatically opening/closing a gas barrel valve, comprising a main plate (11) installed so as to move up and down and to align the position of a gas barrel (60) loaded in a cabinet, a gas barrel connecting portion (20) installed on the lower portion of the main plate (11), separating an end cap (62) from the gas barrel (60) and storing the end cap (62), and then automatically screw-coupling a connector holder (28) to a gas spray nozzle (64), a valve handle unit (50) installed on the main plate (11) so as to rotate around a first shaft (55) and rotating a valve handle (61) of the gas barrel (60) such that the valve handle (61) is locked or unlocked, while encompassing the valve handle (61) of the gas barrel (60), and a valve handle opening/closing unit (40) installed on the upper portion of the main plate (11) so as to operate the valve handle unit (50) in a direction, in which a valve (63) of the gas barrel (60) is opened.

According to another aspect of the present invention, there is provided a device for automatically opening/closing a gas barrel valve, comprising a main plate (11) installed so as to move up and down and to align the position of a gas barrel (60) loaded in a cabinet, a gas barrel connecting portion (20) installed on the lower portion of the main plate (11), separating an end cap (62) from the gas barrel (60) and storing the end cap (62), and then automatically screw-coupling a connector holder (28) to a gas spray nozzle (64), a valve handle unit (50) installed on the main plate (11) so as to rotate around a first shaft (55) and rotating a valve handle (61) of the gas barrel (60) such that the valve handle (61) is locked or unlocked, while encompassing the valve handle (61) of the gas barrel (60), a valve handle gear for rotating around the first shaft, and a valve handle opening/closing unit (40) installed on the upper portion of the main plate (11) so as to operate the valve handle unit (50) in a direction, in which a valve (63) of the gas barrel (60) is opened.

According to a further aspect of the present invention, there is provided a method for automatically opening/closing a gas barrel valve, comprising the step of loading and aligning a gas barrel in a cabinet, the step of separating an end cap from the gas barrel, the step of screw-coupling a connector holder to a gas spray nozzle, from which the end cap has been removed, the step of winding a spring around a first shaft by enabling forward rotation of the first shaft while suppressing reverse rotation of the first shaft, which is installed in a valve handle holder so as to idle, the step of opening a valve by enabling reverse rotation of a valve handle of the gas barrel while preventing forward rotation of the valve handle holder, and the step of automatically closing the valve at the time of replacement of the gas barrel or when a gas leak is detected.

The present invention has several advantages as compared to the prior art.

First, it is possible to realize the automation of the replacement of a gas barrel filled with toxic gas, thereby safely replacing the gas barrel as well as reducing expensive labor costs.

Second, in the process of supplying gas from a gas barrel to the production line, even if a gas leak due to an earthquake or vibration applied to a cabinet or a power outage occurs, the valve of the open gas barrel is automatically shut off quickly so as to prevent the gas from being supplied through a gas supply line, thereby preventing the gas leak from explosion or a worker from becoming addicted to the gas in advance.

Third, since a valve handle gear for opening/closing the valve handle of a gas barrel can be manually opened/closed even in a power outage state, gas can be supplied or blocked more stably.

Fourth, an end cap is stored after being automatically separated from a gas barrel stored in a cabinet and is then automatically fastened so as to close a gas spray nozzle when the gas barrel is replaced, thereby realizing the automatic replacement of the gas barrel, and the end cap may be fastened again quickly so as to close the gas spray nozzle even if gas leaks while removing the end cap because the valve of a valve handle is old, thereby preventing an accident caused by such a gas leak or an accident that may cause workers to become addicted to the gas.

BRIEF DESCRIPTION OF THE DRAWINGS

FIG. 6 is a perspective view of the present invention, in which FIG. 5 is shown in a different direction, FIG. 12A and FIG. 12B are perspective views for explaining the operation states of the end cap support means of the present invention, in which FIG. 12A shows the state, in which an end cap holder is wrapped around the end cap, and FIG. 12B shows the state, in which the end cap is removed by the end cap holder from a gas spray nozzle.

DETAILED DESCRIPTION

Figure 1:
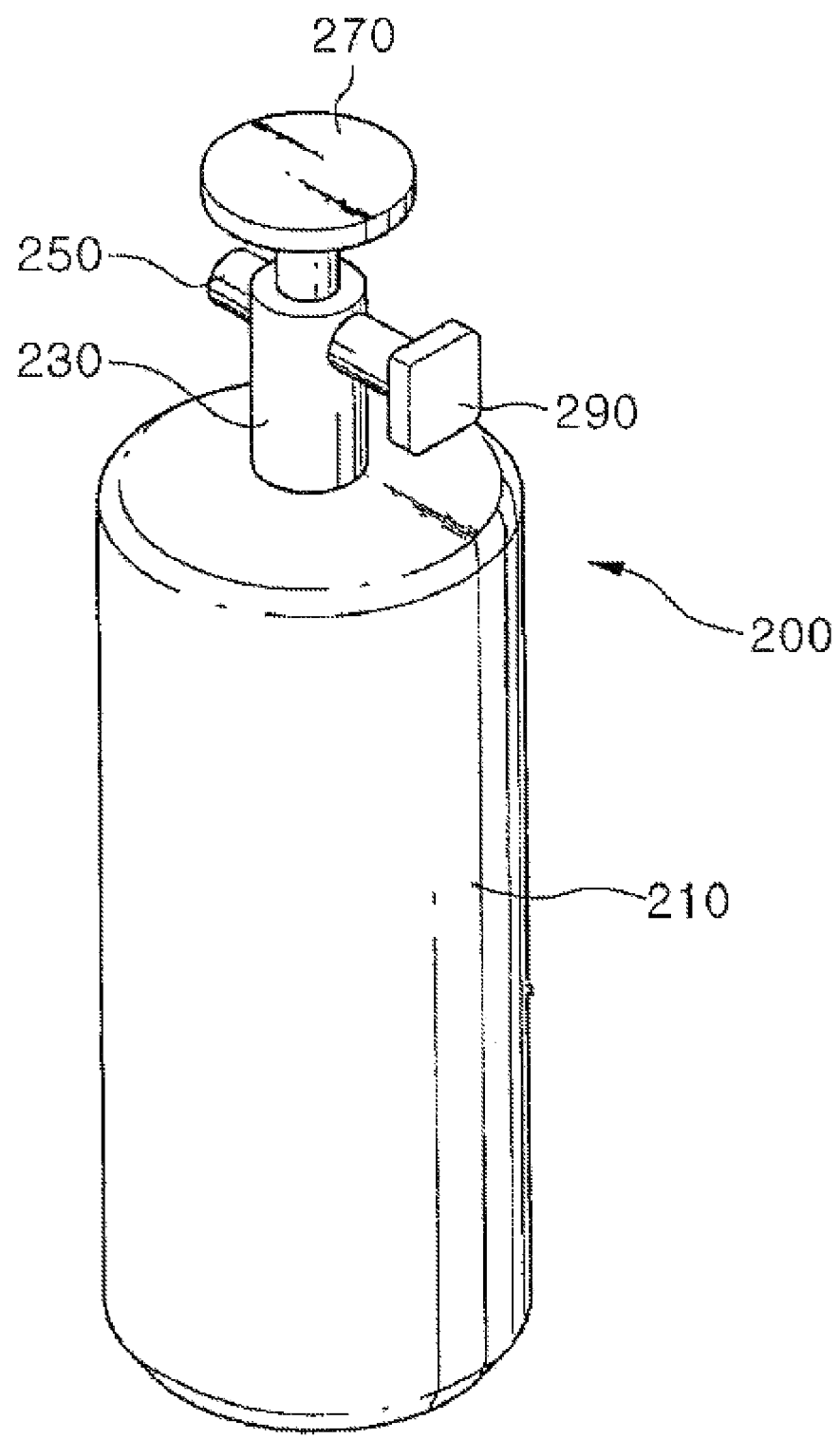
FIG. 1 is a perspective view showing a prior art gas barrel.
Figure 2:
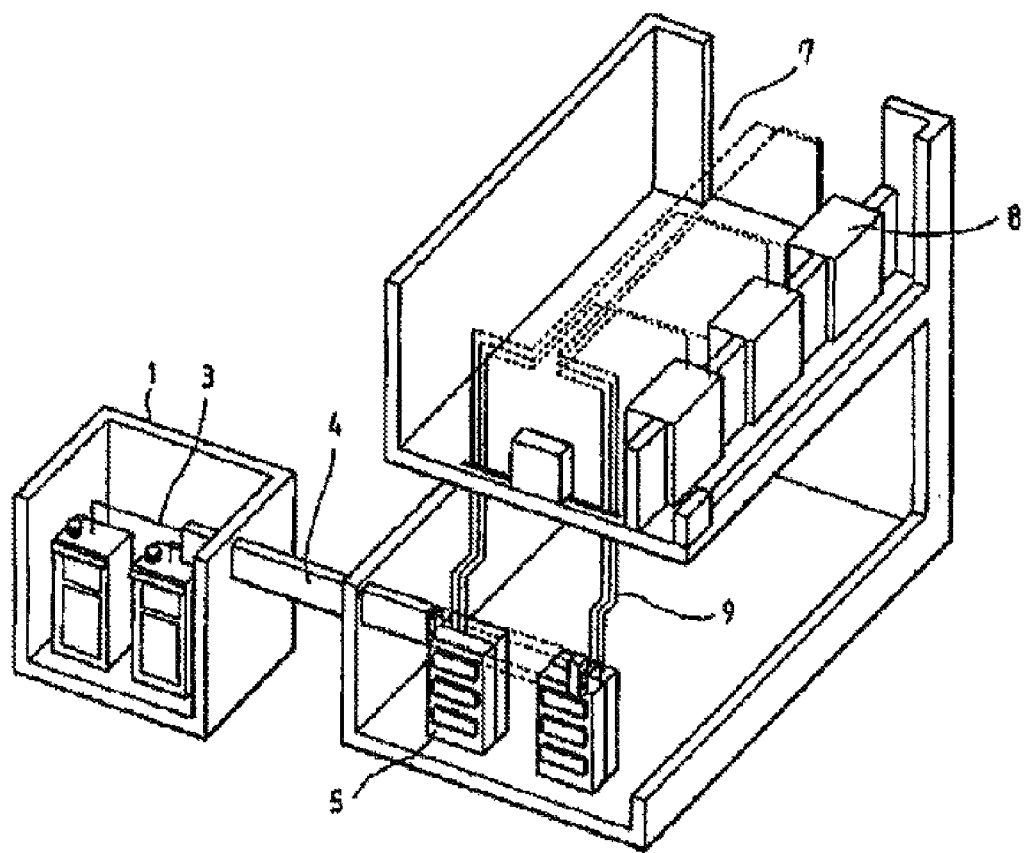
FIG. 2 is a perspective view schematically showing a prior art gas supply device of a semiconductor device.

Hereinafter, exemplary embodiments of the present invention will be described in detail with reference to the accompanying drawings so that those skilled in the art may easily practice the present invention. The present invention may be embodied in many different forms and should not be construed as limited to the embodiments set forth herein. It should be noted that the figures are schematic and not drawn to scale. The relative dimensions and ratios of the parts in the figures are shown exaggerated or reduced in size for clarity and convenience in the figures, and any dimension is merely exemplary and not limiting. In addition, the same reference numerals are used to denote similar features in the same structures, elements, or parts shown in two or more figures.

Figure 3:
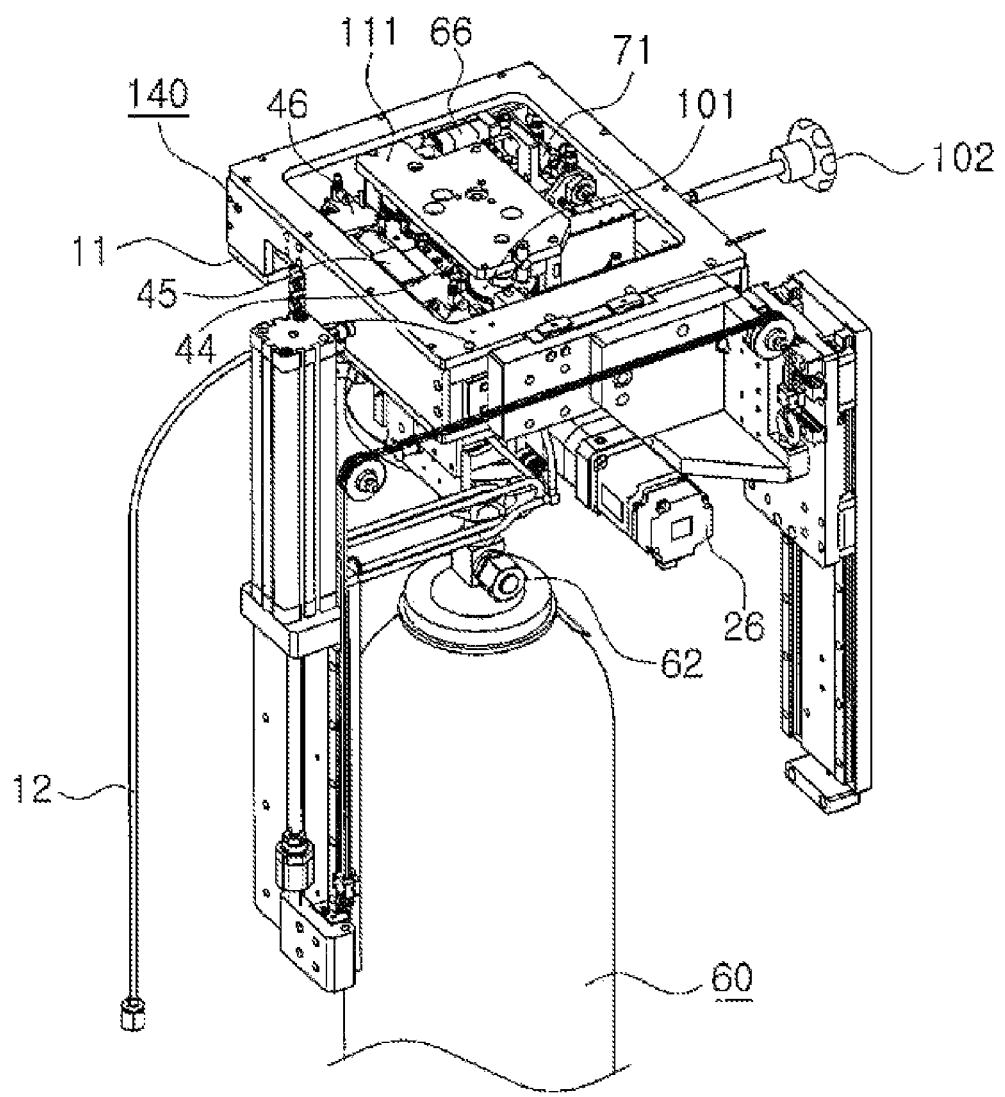
FIG. 3 is a perspective view showing the present invention.
Figure 4:
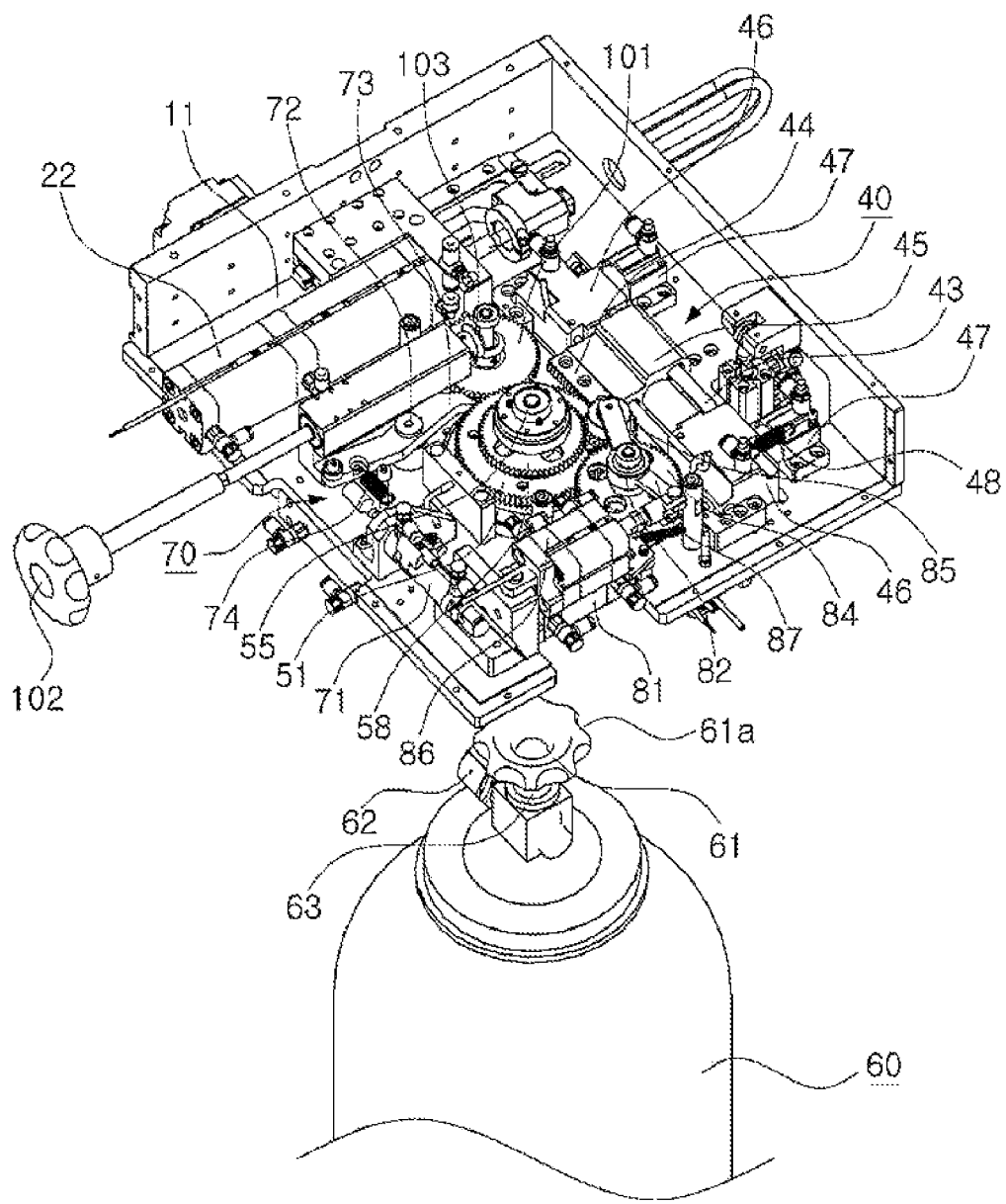
FIG. 4 is a perspective view showing the main parts of the present invention.
Figure 5:
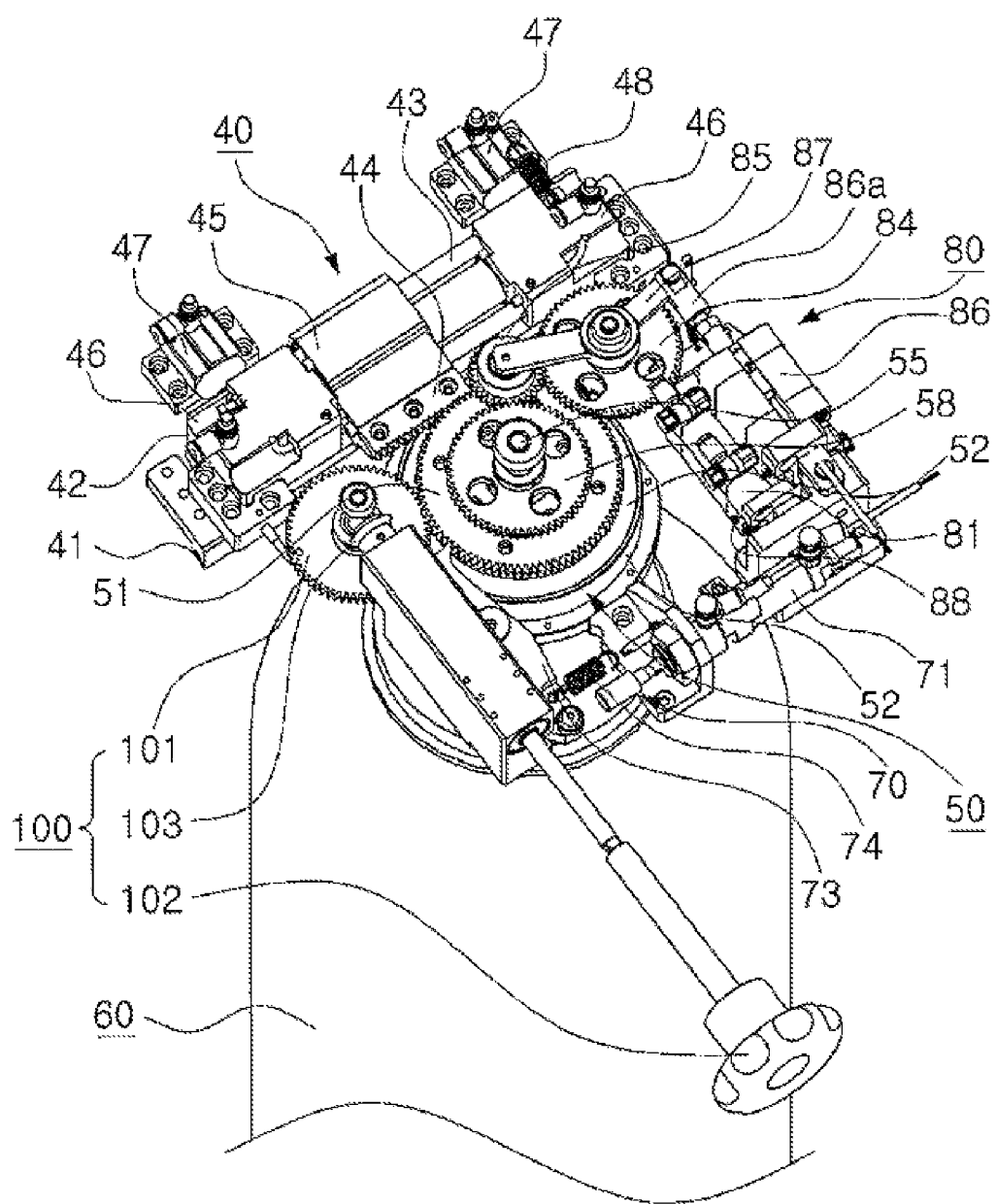
FIG. 5 is a perspective view of the present invention, in which a main plate is removed.

FIG. 3 is a perspective view showing the present invention, FIG. 4 is a perspective view showing the main parts of the present invention, and FIG. 5 is a perspective view of the present invention, in which a main plate is removed. Referring to FIG. 3 to FIG. 5, the present invention includes a main plate 11 installed in a cabinet (not illustrated) so as to move up and down, a gas barrel connecting portion 20 installed on the main plate 11 so that, after an end cap 62 is separated from a gas barrel 60, a connector holder 28 is automatically screw-coupled to a gas spray nozzle 64, a valve handle unit 50 installed on the main plate 11 so as to rotate around a first shaft 55, thereby rotating a valve handle 61 in the clockwise or counterclockwise direction, and a valve handle opening/closing unit 40 installed on the upper portion of the main plate 11 so as to automatically open/close the valve 63 of the gas barrel 60.

According to the present invention, first and second alignment means 120, 130 are provided so as to correct the position of the gas barrel 60 loaded in the cabinet (not illustrated) before the valve handle unit 50 is coupled to the gas barrel 60.

Figure 9:
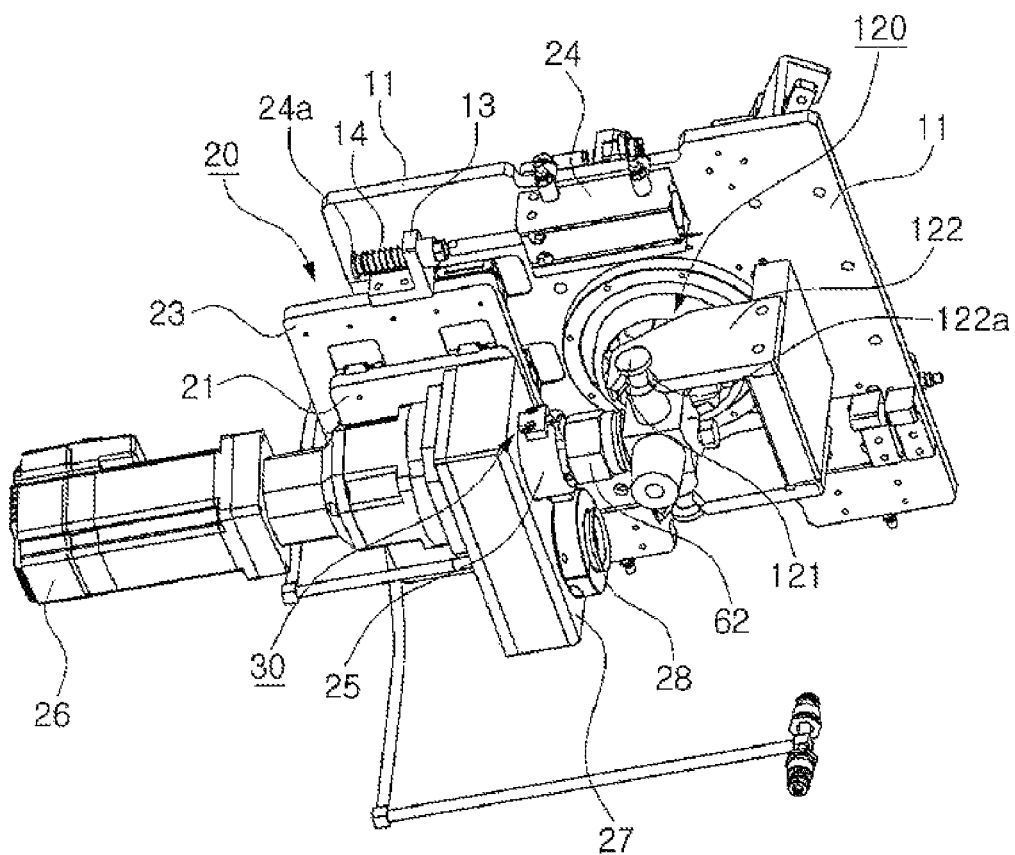
FIG. 9 is a perspective view showing an end cap support means according to the present invention.
Figure 10:
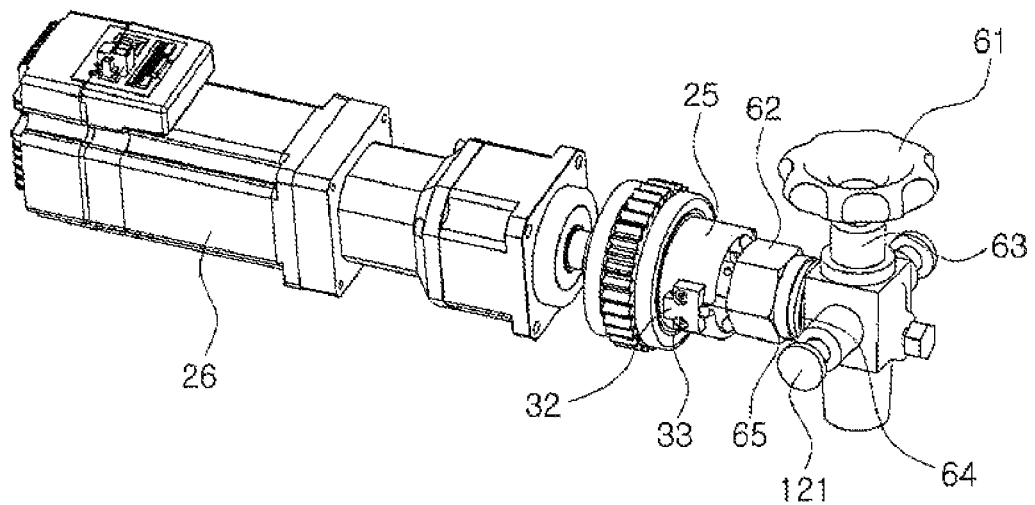
FIG. 10 is a perspective view showing the main parts of the end cap support means of the present invention.

The first alignment means 120 is to automatically correct the position of a gas barrel 60 when raising the gas barrel 60 that is loaded on a lift (not illustrated), as shown in FIG. 9, and includes a positioning rod 121 protruding from at least one side of the valve 63, and a positioning panel 122 installed at the lower portion of the main plate 11 so as to correct the position of the gas barrel 60 while the positioning rod 121 is fitted into an alignment groove 122a, when the valve handle unit 50 is coupled to the valve handle 61.

Therefore, when the valve handle 61 of the gas barrel 60 loaded on the lift is coupled to the valve handle unit 50, even though the position of the gas barrel 60 is shifted, the position is corrected while the positioning rod 121 protruding from the valve 63 is automatically fitted into the alignment groove 122a formed on the positioning panel 122 so that the valve handle 61 is accurately coupled to the valve handle unit 50.

The first alignment means 120 may be adapted when automatically raising the gas barrel 60 that is loaded on the lift in new type of automatic gas barrel opening/closing device including a cabinet, of which width×length is 1200×590 (mm).

However, in an old type automatic gas barrel opening/closing device including a cabinet, of which width×length is 800×590 (mm), it is impossible to install a lift for automatically raising the gas barrel 60 due to the narrow space thereof. Therefore, the second alignment means 130 is designed to be adapted to such an old type automatic gas barrel opening/closing device.

Figure 16:
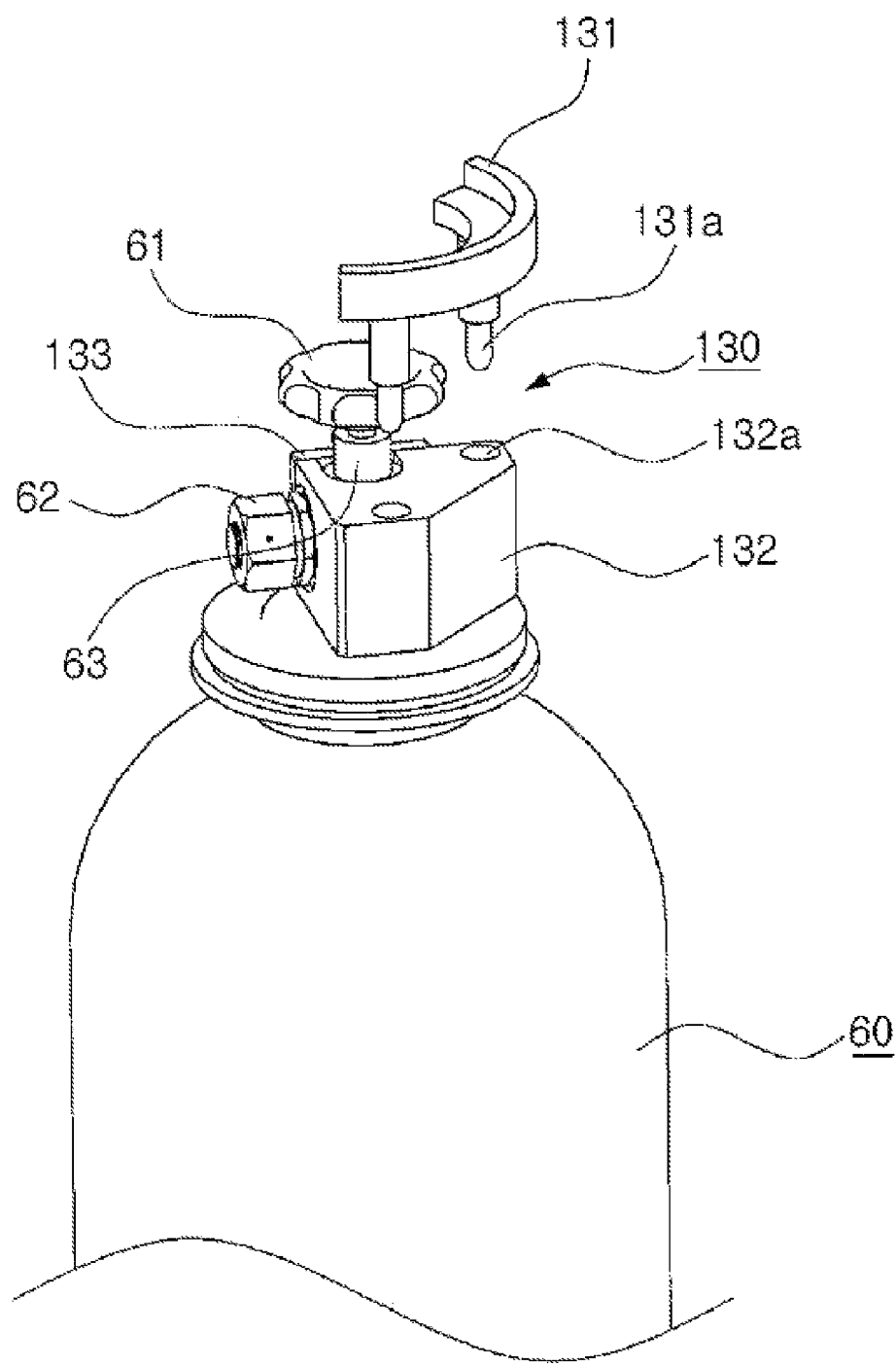
FIG. 16 is an exploded perspective view showing a second alignment means according to the present invention.

The second alignment means 130 includes, as shown in FIG. 16, an aligner 131 fixed to the bottom surface of the main plate 11 and having two or more alignment pins 131a, an alignment block 132 detachably fixed to the valve 63 of the gas barrel 60 and having positioning holes 132a, into which the alignment pins 131a are fitted, and a fastening plate 133 for fixing the alignment block 132 to the valve 63 with a fastening member (not illustrated).

Therefore, if the main plate 11 is lowered in a state, in which the gas barrel 60 is positioned inside the cabinet, a worker finely adjusts the position of the gas barrel 60 while identifying the positions of the alignment pins 131a with the naked eye so that the alignment pins 131a are inserted into the positioning holes 132a of the alignment block 132, thereby aligning the position of the barrel 60.

Figure 8A:
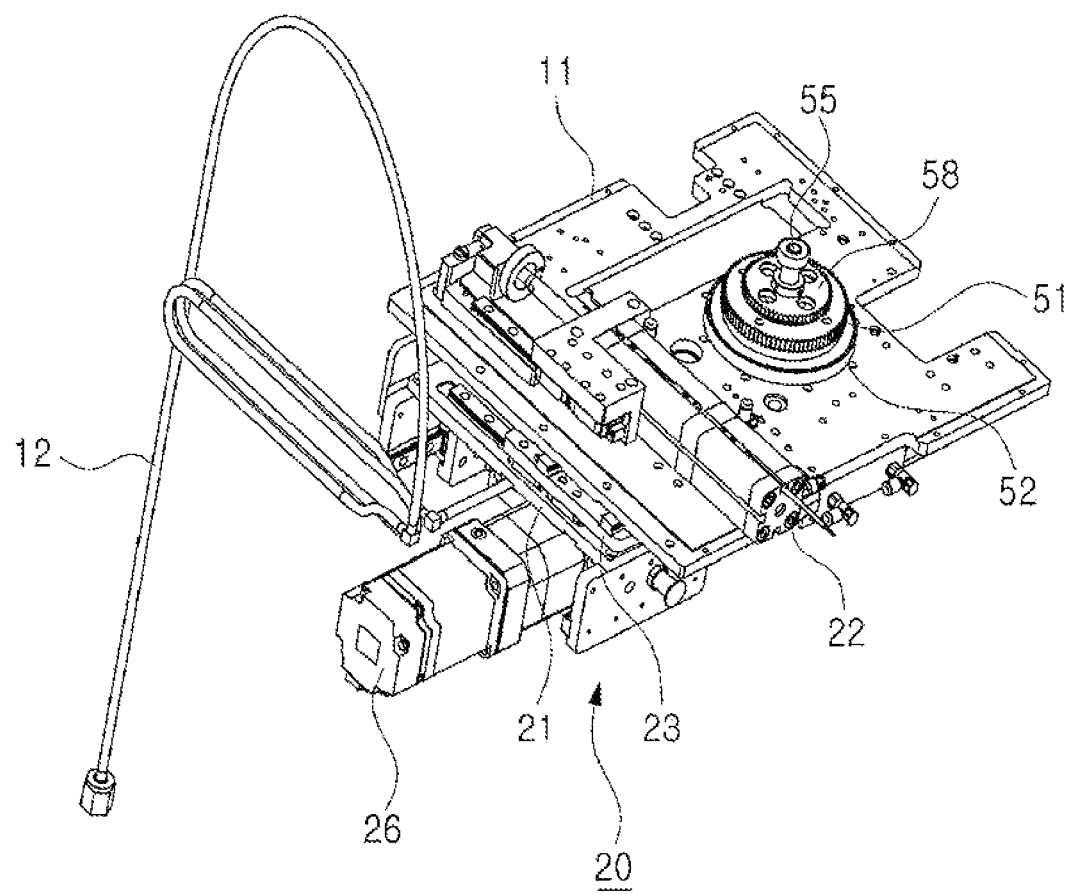
FIG. 8A and FIG. 8B are perspective views showing a gas barrel connecting portion of the present invention.
Figure 8B:
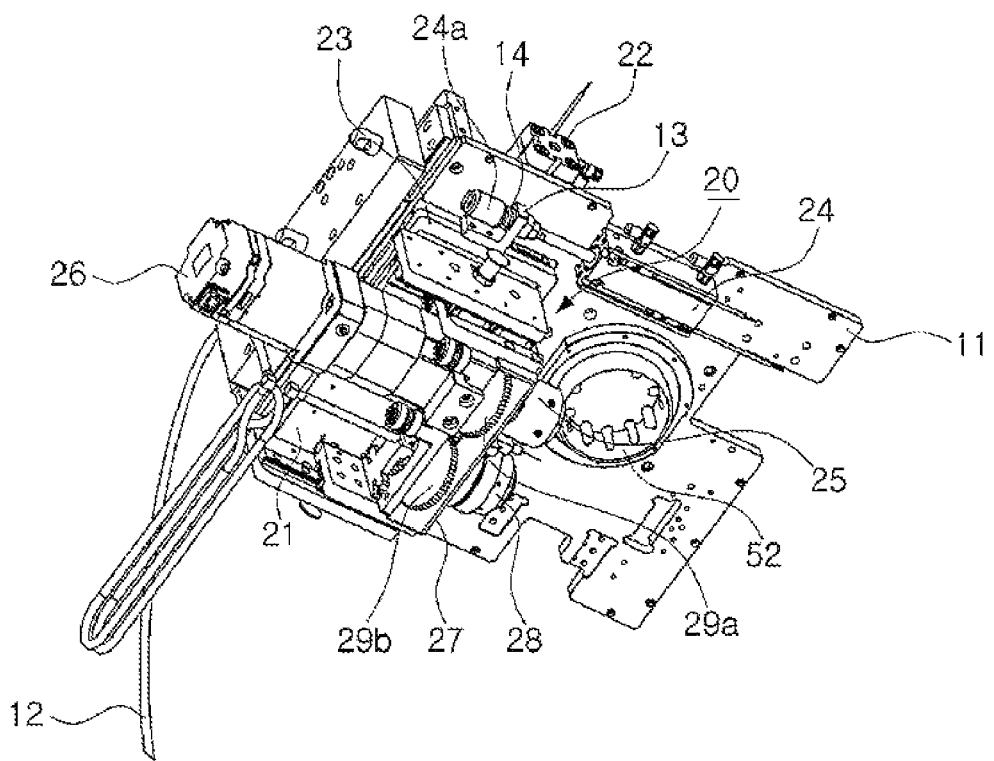

The gas barrel connecting portion 20 includes, as shown in FIGS. 8A and 8B and FIG. 9, a second actuator 24 installed on the main plate 11 so as to move a second installation plate 23 back and forth with respect to the end cap 62, a first actuator 22 installed on the second installation plate 23 so as to move a first installation plate 21 in a direction orthogonal to the movement direction of the second installation plate 23, an end cap holder 25 rotatably installed on a vertical plate 27 fixed to the first installation plate 21 so as to encompass the end cap 62 and to attach or detach the end cap 62, a third actuator 26 for rotating the end cap holder 25 so as to separate or fasten the end cap 62, a connector holder 28 installed on the vertical plate 27 so as to be screw-coupled to the gas spray nozzle 64 of the gas barrel 60, and first and second gears 29a, 29b fixed to the shafts of the end cap holder 25 and the connector holder 28, respectively, and engaged with each other so as to transmit power of the third actuator 26.

Herein, a rod 24a of the second actuator 24 is movably fitted into a bracket 13 fixed to the second installation plate 23 and an elastic member 14 such as a coil spring is fitted around the rod 24a passing through the bracket 13 so as not to be separated therefrom.

This is to compensate the position of the second installation plate 23 by the amount of screw coupling without driving the second actuator 24, when rotating the end cap holder 25 and the connector holder 28.

It is more preferable to provide an end cap support means 30 on the end cap holder 25.

This is to enable the gas spray nozzle 64 of the gas barrel 60 to be closed quickly when replacing the gas barrel 60.

Figure 11:
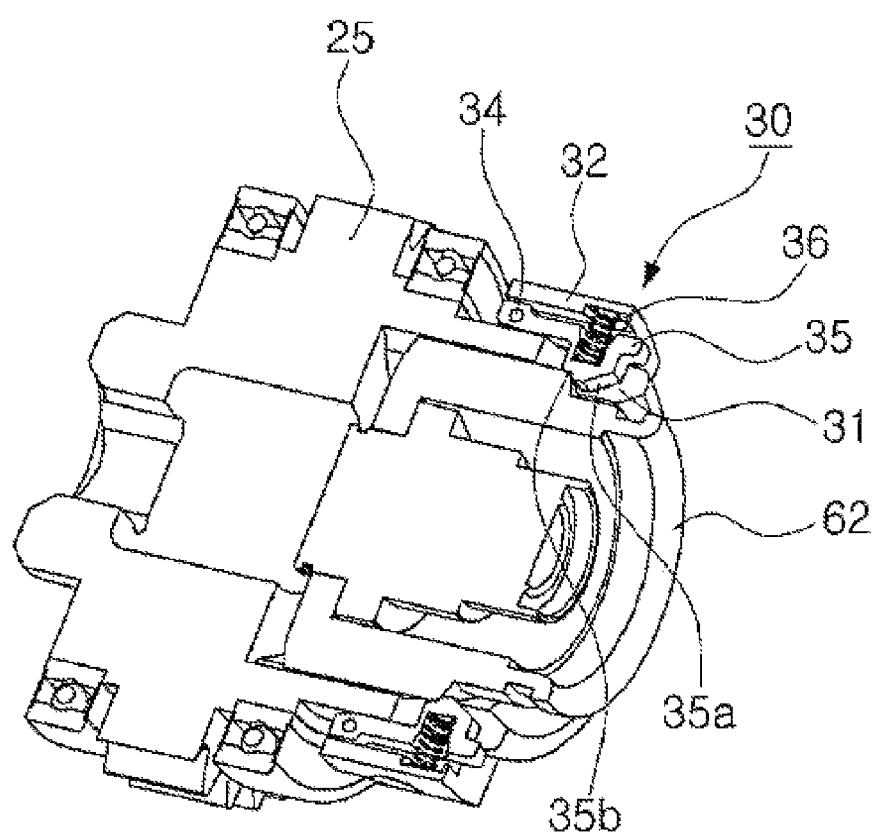
FIG. 11 is a cross-sectional view showing the end cap holder according to an embodiment.
Figure 12A:
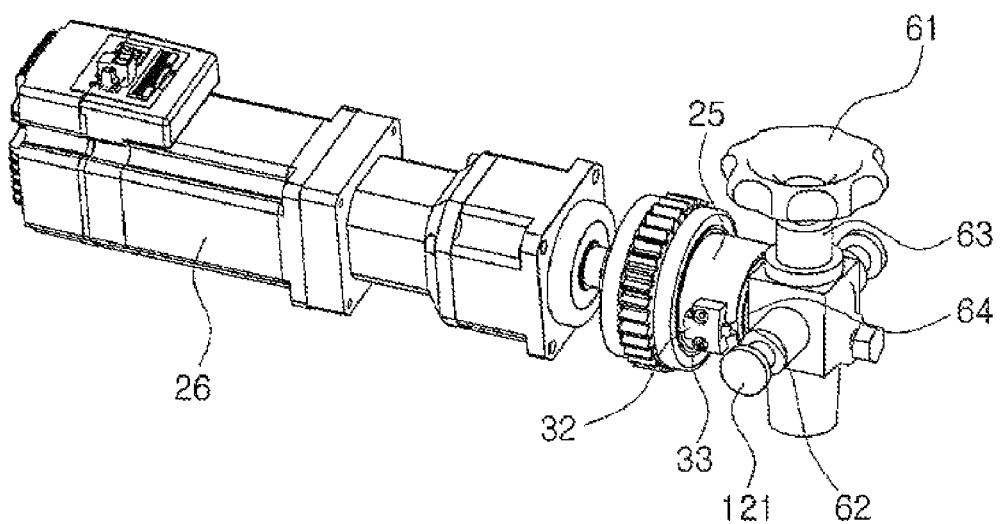
Figure 12B:
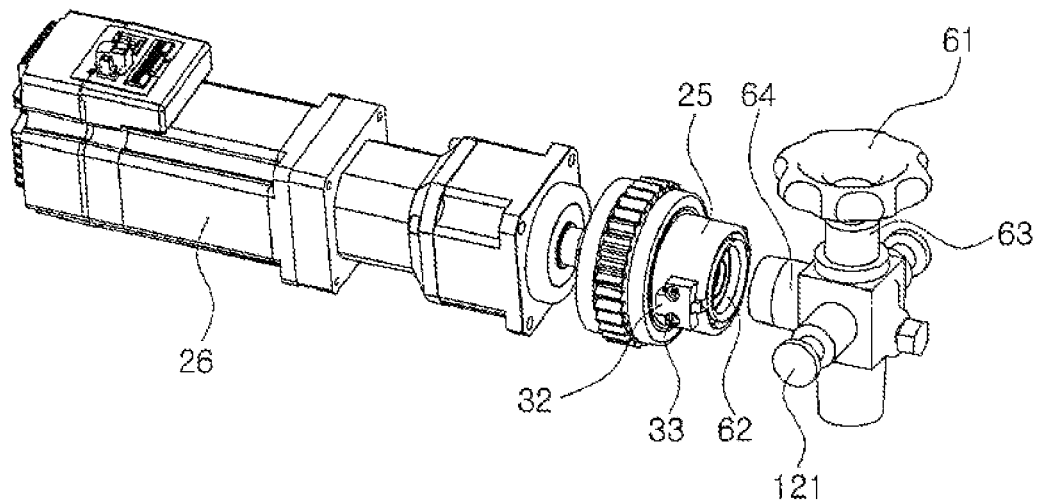
Figure 13:
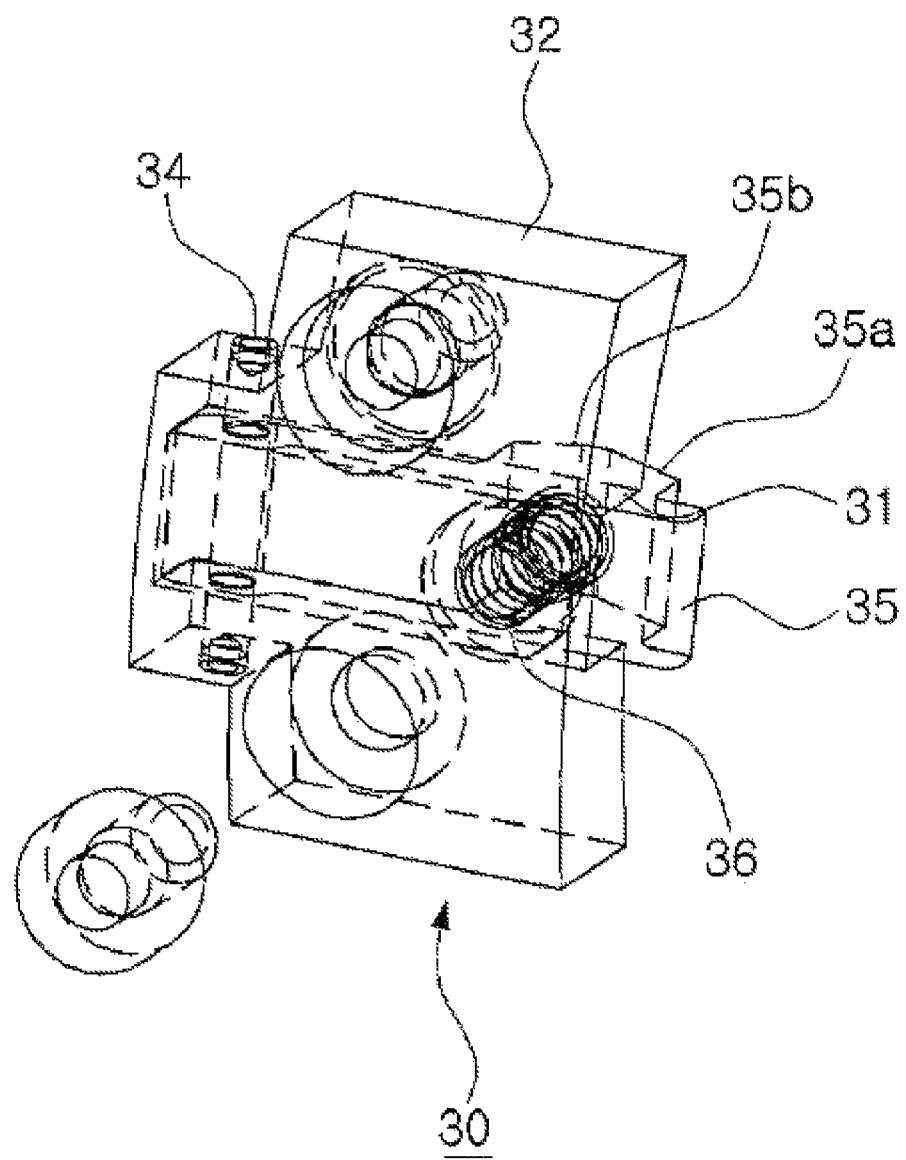
FIG. 13 is a perspective view showing an end cap support means according to an embodiment of the present invention.

The end cap support means 30 according to an embodiment of the present invention includes, as shown in FIG. 11 to FIG. 13, a plurality of through holes 31 formed through the end cap holder 25, a latch block 32 fixed by a fastening member 33 to the end cap holder 25 so as to be positioned outside each through hole, a latch 35 installed on the latch block 32 so as to rotate around a pin 34 and exposed through the through hole 31 to the inside of the end cap holder 25 so as to support the end cap 62 accommodated inside the end cap holder 25, and an elastic member 36 installed between the latch block 32 and the latch 35 so as to elastically press the latch 35 to the inside of the end cap holder 25.

An inclination surface 35a and a locking protrusion 35b are formed on the latch 35 that is exposed through the through hole 31 of the end cap holder 25 to the inside of the end cap holder 25, so that the end cap 62 passes the latch 35 by the inclination surface 35a when storing the end cap 62 in the end cap holder 25 and a protrusion 65 of the end cap 62 is locked and supported by the locking protrusion 35b while the end cap 62 is accommodated.

Figure 14:
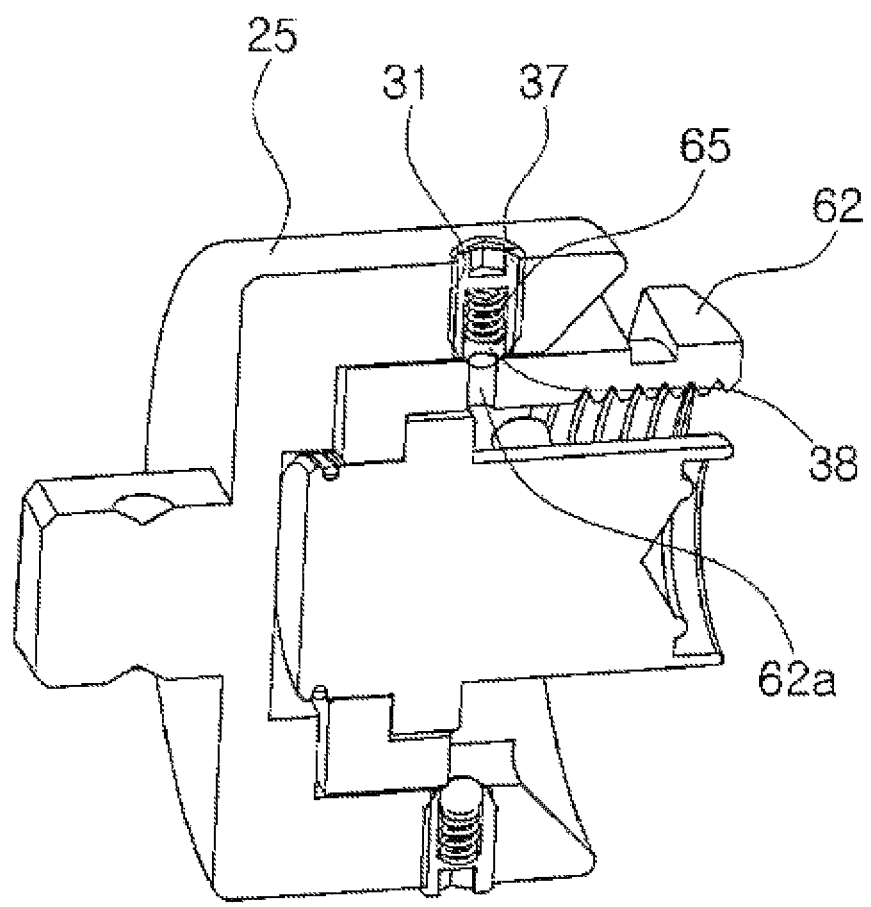
FIG. 14 is a perspective view showing a cross section of an end cap support means according to another embodiment of the present invention.

Meanwhile, the end cap support means 30 according to another embodiment may include, as shown in FIG. 14, a plurality of through holes 31 formed through the end cap holder 25, a housing 37 screw-coupled to each of the through holes, a ball 38 accommodated in a leak test hole 62a of the end cap 62, which is accommodated in the housing 37 and thus accommodated in the end cap holder 25, so as to support the end cap 62, and an elastic member 39 such as a coil spring, installed inside the housing 37 so as to elastically press the ball 38 to the inside of the end cap holder 25.

In addition, it would be understood that the end cap support means might be applied in various forms by those skilled in the art.

In addition, it is possible to prevent the end cap 62 from being separated from the end cap holder 25 by forming only one end cap support means 30 on the end cap holder 25, but it is more preferable to provide a plurality of end cap support means 30 at uniform intervals for more stable support.

Figure 7:
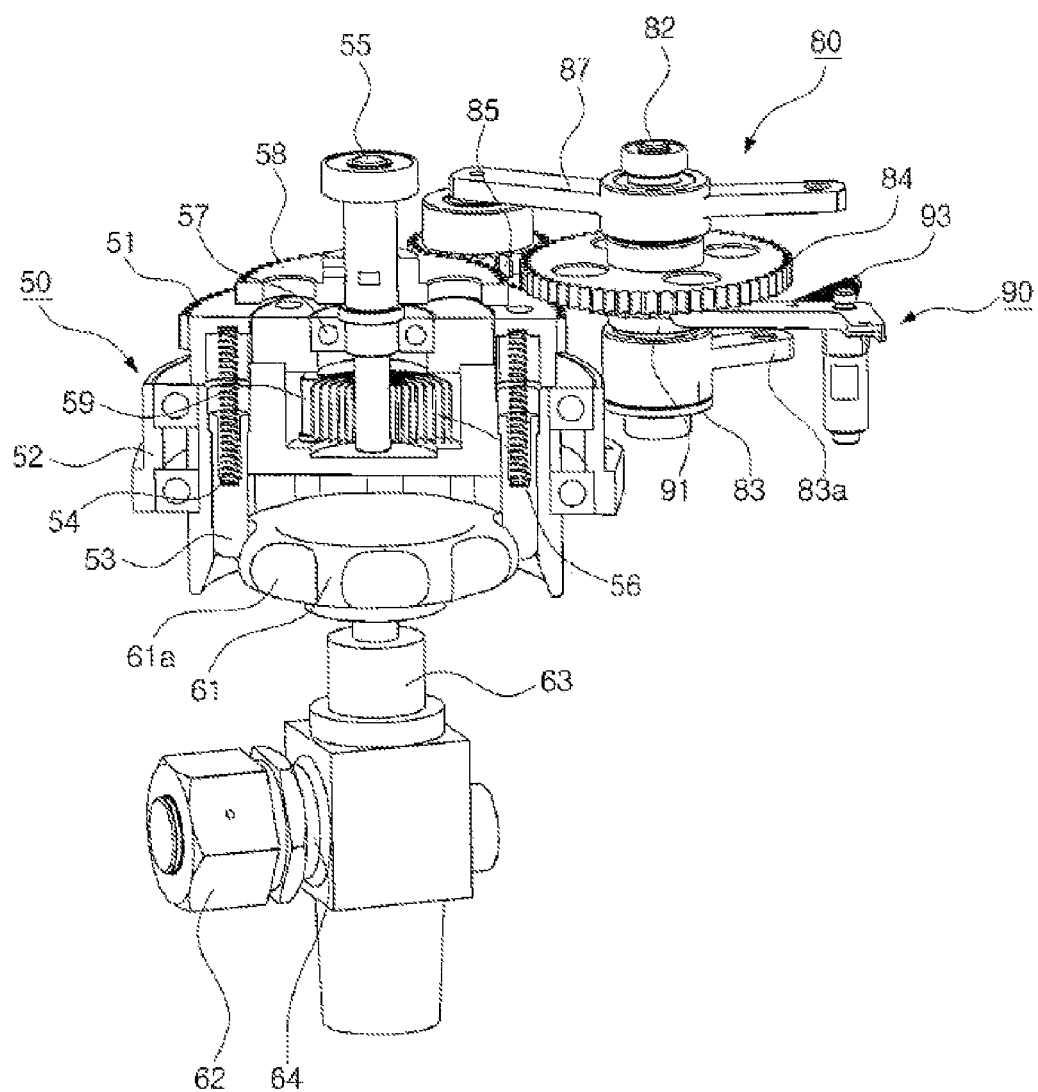
FIG. 7 is a perspective view showing a cross section of a valve handle unit according to the present invention.

The valve handle unit 50 includes, as shown in FIG. 7, a valve handle holder 52 for wrapping and rotating the valve handle 61 of the gas barrel 60, a plurality of locking pins 53 installed in the valve handle holder 52 so as to be locked in recessed portions 61a of the valve handle 61, a fourth elastic member 54 for elastically pressing the locking pin 53 downwards, and the valve handle gear 51 positioned at the upper portion of the valve handle holder 52 so as to rotate in engagement with a rack 44.

The valve handle gear 51 serves to automatically open/close the valve 63 of the gas barrel 60 by the valve handle opening/closing unit 40 installed on the main plate 11.

The valve handle opening/closing unit 40 installed on the main plate 11 so as to rotate the valve handle gear 51 includes, as shown in FIG. 5, a rotation member 42 installed on the top surface of the main plate 11 so as to rotate around a hinge shaft 41, a movement piece 45 installed on the top surface of the rotation member so as to move back and forth along a guide rod 43 and having a rack 44 fixed to one end thereof, one pair of rack drive actuators 46 installed at both sides of the movement piece 45 and operating alternately so as to move the movement piece 45 back and forth, a rotation member actuator 47 installed on the main plate 11 so as to be positioned at one side of each of the rack drive actuators 46, thereby rotating the rotation member 42, and a third elastic member 48 connected between the rack drive actuator 46 and the rotation member actuator 47 so as to restore the rotation member 22 when the drive of the rotation member actuator 47 stops, thereby separating the rack 24 from the valve handle gear 51.

A first reverse rotation prevention means 70 is further provided and prevents the valve handle holder 52 from rotating forwards even if the restoring force of the spring 56 wound around the first shaft 55 is applied, when the valve 63 of the gas barrel 60 is opened by the valve handle holder 52 according to the drive of the valve handle opening/closing unit 40.

Figure 6:
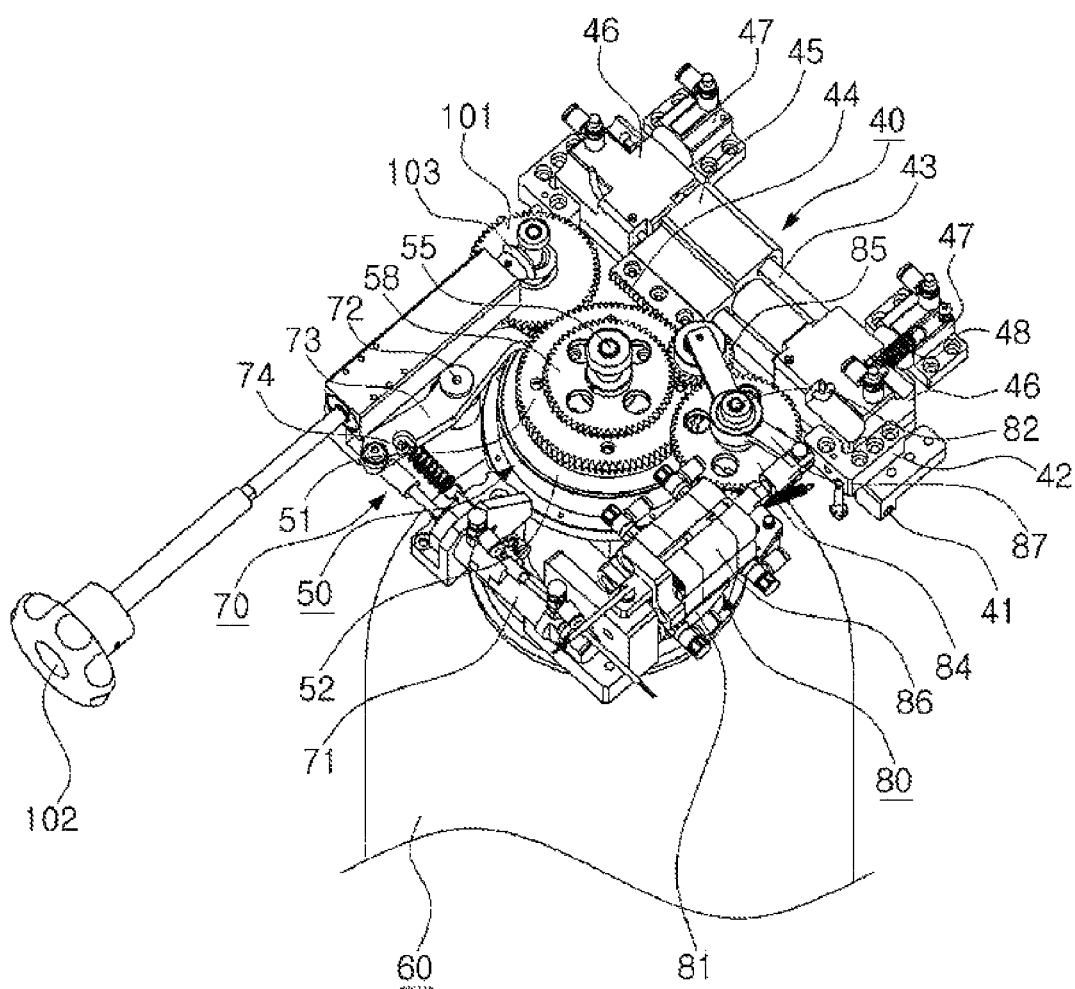

According to an embodiment of the present invention, the first reverse rotation prevention means 70 includes, as shown in FIG. 5 and FIG. 6, a latch drive actuator 71 installed on the main plate 11, a first latch 73 installed on the main plate 11 so as to rotate around a shaft 72 so that one end thereof is engaged with the valve handle gear 51 and the other end is connected to the rod of the latch drive actuator 71, and a first elastic member 74 for applying restoring force to the first latch 73.

Therefore, when the rack 44 of the valve handle opening/closing unit 40 rotates the valve handle gear 51 in the reverse direction so as to open the valve 63 of the gas barrel 60, the first latch 73 is engaged with the valve handle gear 51 and thus suppresses the rotation of the valve handle holder 52 in the forward direction.

Figure 15:
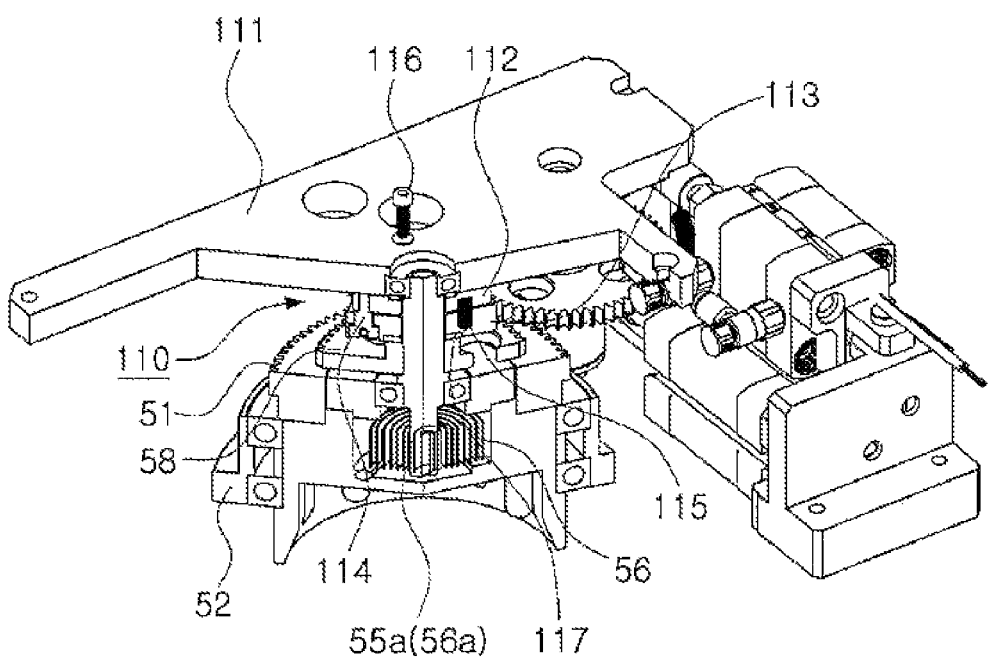
FIG. 15 is a cross-sectional view for explaining an anti-backlash means according to the present invention.

In addition, the first shaft 55 is rotatably installed in the center of the valve handle holder 52 while being supported by a bearing 57, the spring drive gear 58 is fixed to the upper portion of the first shaft 55, a bent portion 56a of the spring 56 is fitted and fixed to a cutout portion 55a formed at the lower end of the first shaft 55, as shown in FIG. 15, and, at the same time, the other end of the spring 56 is fixed to a fixing pin 59 fixed inside the valve handle holder 52.

Therefore, as the spring drive gear 58 rotates in the clockwise direction, the first shaft 55 winds the spring 56.

A spring winding unit 80 is provided on the main plate 11 positioned at one side of the valve handle gear 51 so as to amplify the number of rotation according to the drive of a spring winding actuator 81 and to transmit the same to the spring drive gear 58.

According to an embodiment of the present invention, the spring winding unit 80 includes, as shown in FIG. 7, a second shaft 82 rotatably installed on the main plate 11, a one-way clutch 83 such as a needle roller clutch bearing rotatably installed on the second shaft 82 and having a lever 83*a* at one end, the spring winding actuator 81 hinge-coupled to the lever 83*a* with a rod so as to rotate the second shaft 82, an amplification gear 84 fixed to the second shaft 82 so as to amplify the number of rotation of the second shaft 82, and a link 87 fixed to the second shaft 82 so that a planetary gear 85 engaged with the amplification gear 84 and the spring drive gear 58 is rotatably installed at one end of the link 87 and a rod 86*a* of a planetary gear drive actuator 86 is hinge-coupled to the other end of the link 87.

A sensor 88 is installed on the spring winding actuator 81 so as to detect the movement of a piston so that if the spring 56 is completely wound around the first shaft 55 and the sensor 88 does not detect the movement of the piston, then a control unit (not illustrated) stops the driving of the spring winding actuator 81.

The spring winding unit 80 is provided with a second reverse rotation prevention means 90 for preventing the second shaft 82 from reverse rotation when the spring winding actuator 81 returns the one-way clutch 83 to its initial position.

Referring to FIG. 7 showing an embodiment of the present invention, the second reverse rotation prevention means 90 includes a second latch wheel 91 fixed to the second shaft 82, a second latch 92 engaged with the second latch wheel 91 so as to prevent the second shaft 82 from reverse rotation upon restoration of the one-way clutch 83, and a second elastic member 93 having one end connected to the second latch 92.

An anti-backlash means 110 is further provided on the first shaft 55 so as to prevent backlash from occurring due to incomplete release of the spring 56, when the valve handle holder 52 is separated from the valve handle 61.

This is to prevent the fixing portion of the spring 56 from breaking due to the impact repeatedly applied to the bent portion 56*a* of the spring 56, which is fitted into the cutout portion 55*a* of the first shaft 55, in response to the backlash of the first shaft 55, in which the first shaft 55 rotates excessively, when the valve handle holder 52 is separated from the valve handle 61 in the closed state of the valve handle 61 while the wound spring 56 is released.

According to an embodiment of the present invention, the anti-backlash means 110 includes, as shown in FIG. 15, a fixing block 112 fitted to the first shaft 55 and fixed to a top plate 111 by a fastening member 116, a pressing member 113 fitted to the first shaft 55 so as to be positioned at the lower portion of the fixing block 112 and to be connected to the top surface of the spring drive gear 58, a guide pin 114 for allowing the pressing member 113 to move up and down in the fixing block 112, and a fifth elastic member 115 installed between the fixing block 112 and the pressing member 113 so as to elastically press the pressing member 113 downwards.

Herein, it is more preferable that a brake pad 117 is fixed to the bottom surface of the pressing member 113 because friction force may be further increased and the occurrence of backlash may be further suppressed.

According to the present invention, a manual opening/closing means 100 is further provided to manually open/close the gas spray nozzle 64 of the gas barrel 60 in an emergency.

According to an embodiment of the present invention, the manual opening/closing means 100 includes, as shown in FIG. 5, a valve handle manual rotation gear 101 rotatably installed on the main plate 11 so as to be engaged with the valve handle gear 51, a manual knob 102 installed so as to be exposed to the outside of the main plate 11 and to rotate the valve handle manual rotation gear 101, and a power transmission means 103 for transmitting the rotation of the manual knob 102 to the valve handle manual rotation gear 101.

The power transmission means 103 is a gear for transmitting power in a 90° direction, wherein one pair of bevel gears are adapted in the present invention.

Thus, the manual opening/closing means 100 is provided as above so as to manually open/close the valve 63 of the gas barrel 60 even in a state, where the rack 44 is spaced apart from the valve handle gear 51 due to a sudden power outage, the latch drive actuator 71 is powered off so that the first latch 73 is spaced apart from the valve handle gear 51, and the planetary gear drive actuator 86 is powered off so that the planetary gear 85 is spaced apart from the spring drive gear 58.

It could be understood that as for all the actuators used in the present invention, it is possible to employ hydraulic or pneumatic cylinders, or employ step motors, servo motors, or the like as necessary.

Now the operations of the present invention will be described as follows.

First, a description will be given from an initial state in which the gas barrel 60 does not exist in the cabinet (not illustrated).

If the gas barrel 60 is loaded on the lift (not illustrated), which is positioned in the cabinet and can be lifted or lowered, the lift is lifted to a top dead center in a state, in which the gas barrel 60 is preliminarily aligned by an alignment means (not illustrated), and then the main plate 11 is lowered, since the main plate 11 and gas barrel 60 are provided with the first alignment means 120 for accurately aligning the valve handle 61 with the valve handle holder 52, the position of the gas barrel 60 is finely corrected while the positioning rod 121 fixed to protrude to the outside of the valve 63 is fitted into the alignment groove 122*a* of the positioning panel 122, which is fixed to the main plate 11, so that the valve handle holder 52 installed on the main plate 11 is accurately coupled to the valve handle 61 of the gas barrel 60 as shown in FIG. 7.

The above operation has been explained with respect to an automatic type of automatic gas barrel opening/closing device, which loads a gas barrel 60 on a lift so as to lift the same.

Figure 17:
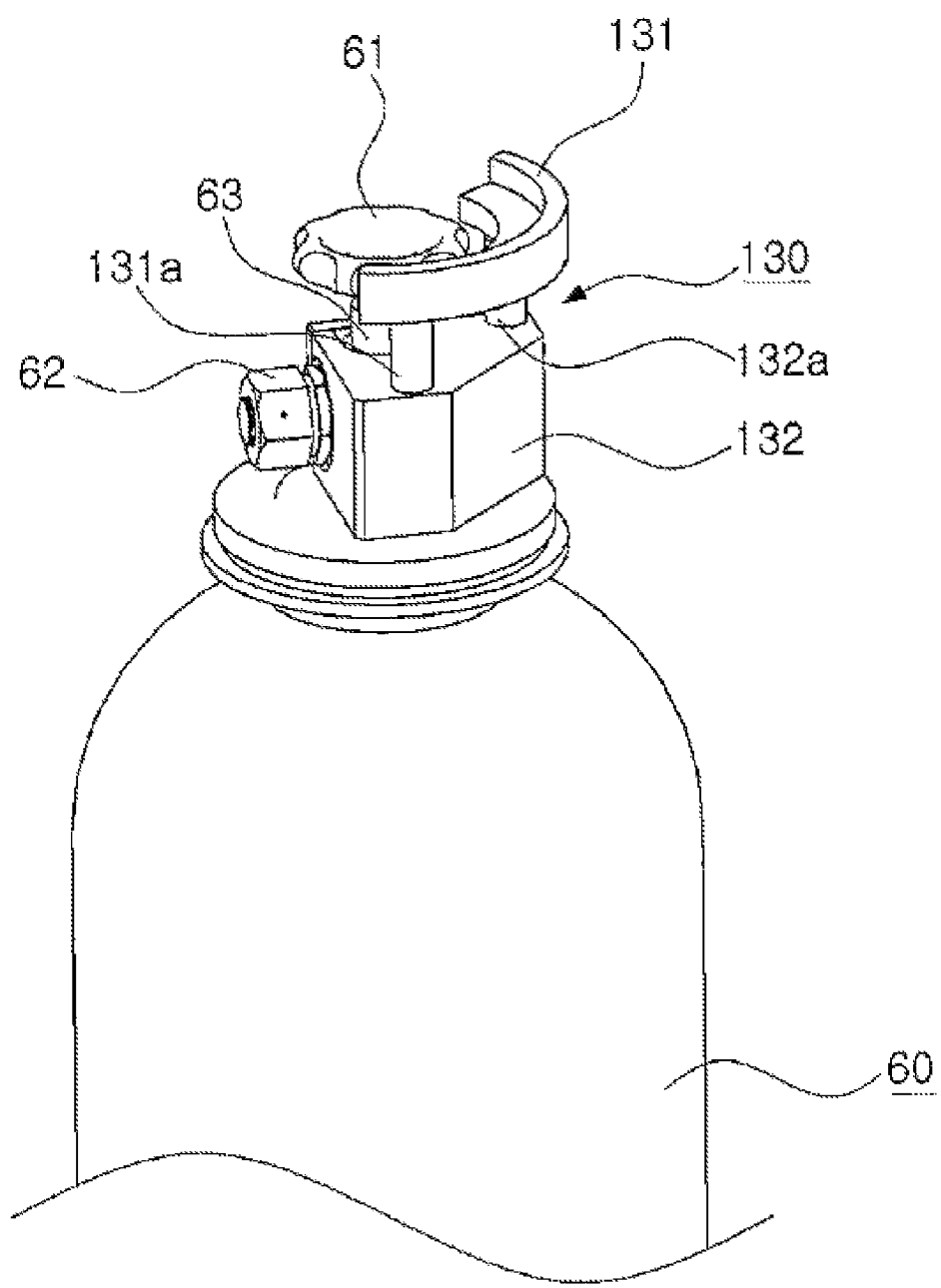
FIG. 17 is perspective view showing the state, in which a gas barrel is aligned lowering the main plate.

However, in the case where the gas barrel 60 is loaded in an old type cabinet, the gas barrel 60 is not lifted but in a stopped state. Therefore, when the main plate 11 is lowered, a worker finely adjusts the position of the gas barrel 60 so that the alignment pin 131*a* is fitted into the positioning hole 132*a* of the alignment block 132 installed on the valve 63 of the gas barrel 60, as shown in FIG. 17, while checking the alignment pin 131*a* of the second alignment means 130 with the naked eye. Therefore, the valve handle holder 52 installed on the main plate 11 is accurately coupled to the valve handle 61 of the gas barrel 60 (S100).

Herein, the gas barrel 60 in the automatic gas barrel opening/closing device is automatically lifted or lowered by means of the lift. On the other hand, since the gas barrel 60 loaded in the old type cabinet is in a stopped state and the valve handle holder 52 installed on the main plate 11 is coupled to the valve handle 61 of the gas barrel 60 in the stopped state, it could be understood that the distance between the gas barrel 60 and the main plate 11 should be designed as narrow as the movement distance of the lift.

When the valve handle 61 is coupled to the valve handle holder 52 in the operation as described above, depending on the position of the valve handle 61, if the locking pin 53 matches the recessed portion 61*a* of the valve handle 61, then the locking pin 53 is inserted into the recessed portion 61*a*.

However, if the locking pin 53 is positioned out of alignment with the recessed portion 61*a* of the valve handle 61, the locking pin 53 is pressed against the top surface of the valve handle 61 and then lifted while compressing the fourth elastic member 54. After that, when the recessed portion 61*a* of the valve handle 61 matches the locking pin 53 by the rotation of the valve handle holder 52, the locking pin 53 is lowered by the restoring force of the fourth elastic member 54 and then fitted into the recessed portion 61*a* so that the position of the valve handle holder 52 is corrected, thereby completing the coupling therebetween.

After the main plate 11 is lowered and the valve handle holder 52 installed on the main plate 11 is assembled to the valve handle 61, the second and third actuators 24, 26 of the gas barrel connecting portion 20 are driven simultaneously and enable the end cap holder 25 to rotate when moving the second installation plate 23 to the gas barrel 60 side. This is to ensure that the end cap 62 is accurately inserted into the end cap holder 25, since each of the end cap holder 25 and the end cap 62 has a hexagonal shape so that even if the positions of the end cap holder 25 and the end cap 62 do not match each other, the end cap holder 25 rotates continuously in a state, in which the end cap holder 25 and the end cap 62 abut each other, until the end cap holder 25 matches the end cap 62 each other.

Accordingly, the end cap 62, which closes the inlet of the gas spray nozzle 64, is accommodated in the end cap holder 25.

Referring to FIG. 11 showing an embodiment of the present invention, as the end cap 62 is accommodated in the end cap holder 25 in this way, a plurality of latches 35 installed on the end cap holder 25 open outwards around the pins 34 while compressing the elastic members 36 by the end cap 62, wherein the latches 35 have the inclination surfaces 35*a* formed on the entrance portion of the latches 35 so that the end cap 62 is smoothly inserted into the end cap holder 25. After the insertion of the end cap 62 is finished, the latches 35 are returned to the initial state thereof by the restoring force of the elastic members 36 and the locking protrusions 35*b* of the latches 35 are held and supported by the protrusion 65 of the end cap 62 so that the end cap 62 is maintained in a stably accommodated state, as shown in FIG. 12A.

However, referring to FIG. 14 showing another embodiment, the ball 38 is exposed under the lower portion of the housing 37 screw-coupled to the end cap holder 25, wherein if the ball 38 is retracted backwards while compressing the elastic member 39 by the end cap 62 and then the ball 38 reaches the leak test hole 62*a* formed in the end cap 62, then the ball 38 is fitted into the leak test hole 62*a* of the end cap 62 while being returned to the initial state thereof by the restoring force of the elastic member 39, so that the end cap 62 is maintained in a stably accommodated state, as shown in FIG. 14.

After the end cap 62 is accommodated inside the end cap holder 25 by the above-mentioned operation, as shown in FIG. 12A, the third actuator 26 for rotating the end cap holder 25 is driven so as to rotate the end cap holder 25 in the counterclockwise direction so that the end cap 62 is released from the gas spray nozzle 64, wherein the rod 24*a* of the second actuator 24 is fitted into the bracket 13 fixed to the one side of the second installation plate 23, on which the third actuator 31 is installed, and the elastic member 14 is maintained in the compressed state around the rod 24*a*, as shown in FIG. 8*b*, so that the second installation plate 23 and the end cap holder 25 are moved to the left in the drawing by the distance that the end cap 62 is released by the restoring force of the elastic member 14 and thus the end cap 62 is separated from the gas spray nozzle 64 while being accommodated in the end cap holder 25, as shown in FIG. 12B (S200).

At this time, the first and second gears 19*a*, 19*b* are engaged with the shafts of the connector holder 28 and the end cap holder 25 so that the connector holder 28 idles in the clockwise direction.

After the end cap 62 is removed from the gas spray nozzle 64, the first installation plate 21 is moved by driving the first actuator 22 so that the centers of the connector holder 28 and the gas spray nozzle 64 match each other, and then the second installation plate 23 is moved forwards to the gas barrel 60 side by driving the second actuator 24 so that the connector holder 28 abuts the gas spray nozzle 64.

In this state, if the third actuator 26 is driven reversely and rotates the end cap holder 25 in the counterclockwise direction, then the connector holder 28 rotates in the clockwise direction so that the connector holder 28 is screw-coupled to the gas spray nozzle 64 (S300).

Figure 18:
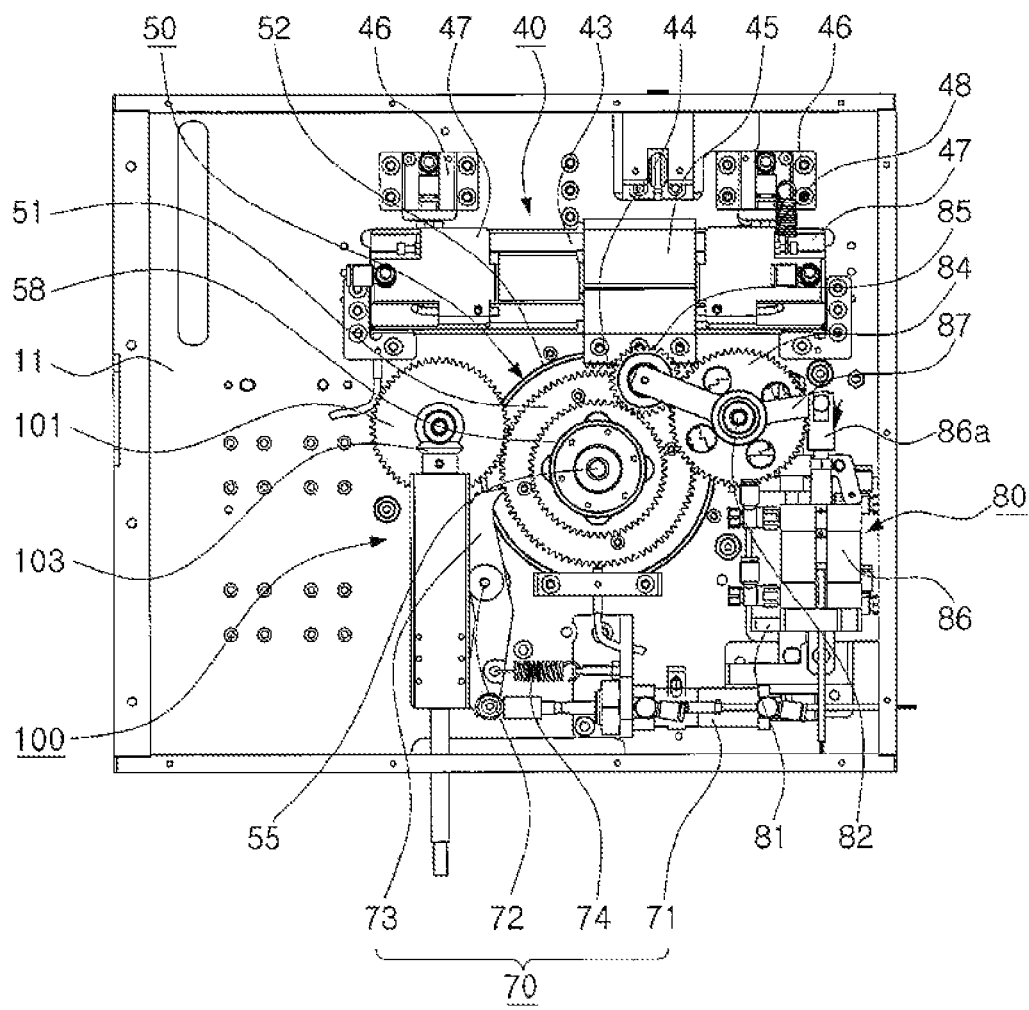
FIG. 18 is a plane view of the present invention, in which the valve handle gear of the valve handle unit and the rack of a valve handle opening/closing unit are separated and the valve handle gear and a first latch are engaged.

In the state, where the end cap 62 is removed from the gas barrel 60 and the connector holder 28 is coupled to the gas spray nozzle 64 as described above, the rotation member actuator 47 is turned off so that the rack 44 is spaced apart from the valve handle gear 51 and the latch drive actuator 71 is turned on so that the first latch 73 is engaged with the valve handle gear 51, as shown in FIG. 18.

In addition, the planetary gear drive actuator 86 is turned on so that the planetary gear 85 is engaged with the spring drive gear 58 and the second latch 92 is engaged with the second latch wheel 91, as shown in FIG. 7.

After the valve handle holder 52 of the valve handle unit 50 is assembled to the valve handle 61 of the gas barrel 60 and the connector holder 28 is screw-coupled to the gas spray nozzle 64 as described above, the spring 56 must be wound around the first shaft 55 by using the spring winding unit 80 before opening the valve 63 with the rotation of the valve handle 61 so as to supply gas through the gas line.

This is to automatically shut off the valve handle 61 so as to stop gas supply in a short time even if a power outage occurs or gas leaks due to an accident in the process of opening the valve 63 by rotating the valve handle 61 of the gas barrel 60 in order to supply gas through the gas line.

In order to wind the spring 56 positioned inside the valve handle holder 52, as shown in FIG. 5 and FIG. 7, if the spring winding actuator 81 is turned on and pulls the rod hinge-coupled to the lever 83*a* of the one-way clutch 83, the second shaft 82 rotates in the clockwise direction and thus the number of rotation is amplified by the amplification gear 84 such that the planetary gear 85 rotates in the counterclockwise direction and the spring drive gear 58 rotates in the clockwise direction, thereby winding the spring 56 around the first shaft 55.

Herein, even if the second latch 92 is engaged with the second latch wheel 91 installed on the second shaft 82, the second latch 92 moves over the threads of the second latch wheel 91 while tensioning the second elastic member 93 such that the second shaft 82 can rotate.

In the above operation, since the first latch 73 positioned at the upper portion of the valve handle holder 52 is engaged with the valve handle gear 51 and thus the valve handle holder 52 does not move, the spring 56 fixed to the fixing pin 59 with one end is wound around the first shaft 55.

After the spring winding actuator 81 rotates the first shaft 55 by pulling the rod as described above, the spring winding actuator 81 pushes the rod back, wherein the second shaft 82 does not rotate in spite of the counterclockwise rotation of the one-way clutch 83 since the second latch 92 is held on the second latch wheel 91 (S400).

The operation of winding the spring 56 by the first shaft 55 through the operation of the spring winding actuator 81 is performed by the number of times set in the control unit (not illustrated), wherein the driving of the spring winding actuator 81 is set in the control unit so as to be stopped in a state, in which the spring is not completely wound by the first shaft 55.

This is because the fixing pin 59 by which one end of the spring 56 is fixed is installed on the valve handle holder 52 so that the spring 56 is wound even when the rack 44 rotates the valve handle gear 51 so as to open the valve 63 of the gas barrel 60 at a later time.

After winding the spring 56, of which one end is fixed to the fixing pin 59 and the other end is fixed to the first shaft 55, by the operation of the spring winding unit 80, the valve 63 of the gas barrel 60 has to be opened using the valve handle opening/closing unit 40.

Figure 19:
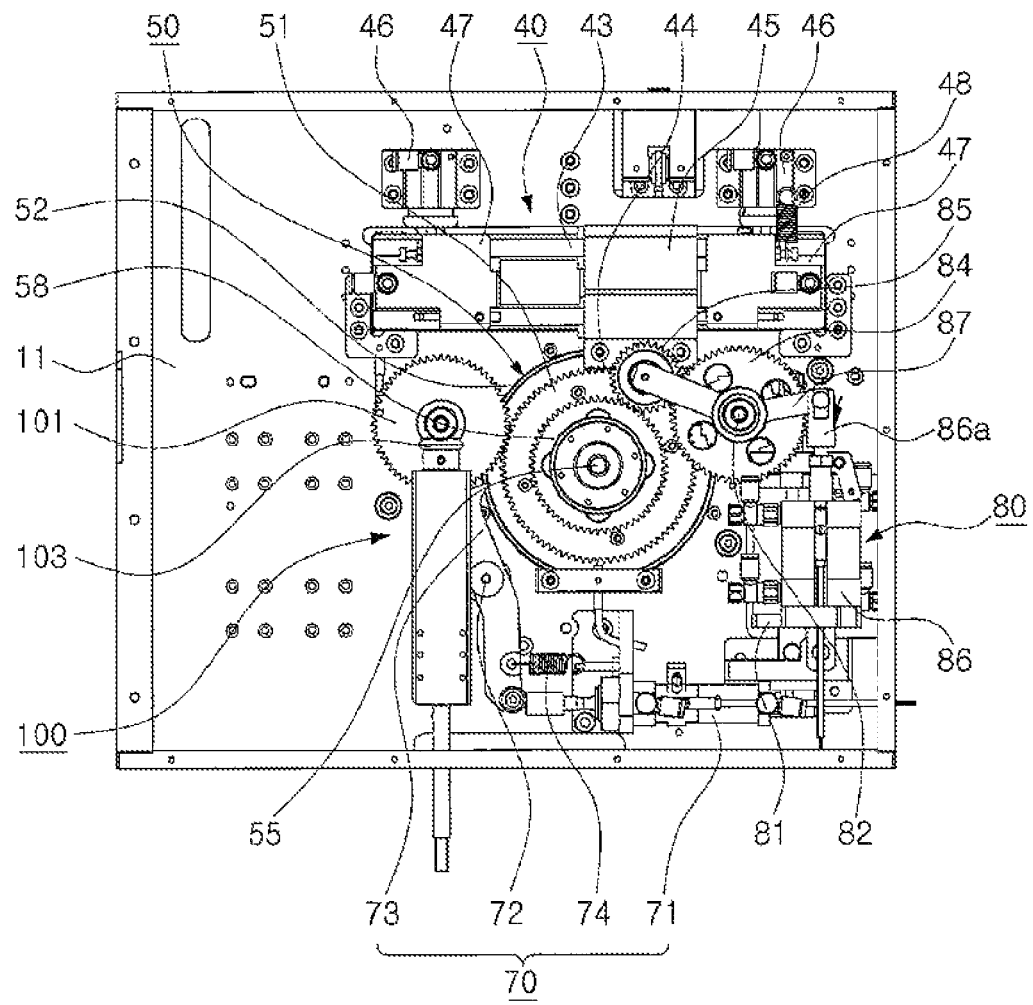
FIG. 19 is a plane view of the present invention, in which the rack of the valve handle opening/closing unit is engaged with the valve handle gear.

In order to open the valve 63 of the gas barrel 60, if the rotation member actuators 47 are driven simultaneously and push the rotation member 42 to the valve handle gear 51 side in the state as shown in FIG. 18, the rotation member 42 that is installed so as to rotate around the hinge shaft 41 rotates while tensioning the third elastic member 48 such that the rack 44 fixed to one end of the movement piece 45 is engaged with the valve handle gear 51, as shown in FIG. 19.

If the latch drive actuator 71 that is the driving source of the first reverse rotation prevention means 70 is turned off in a state, in which the rack 44 is engaged with the valve handle gear 51 as above, the rod of the latch drive actuator 71 is pulled by the restoring force of the tensioned first elastic member 74 so that the first latch 73 rotates around the shaft 72 in the counterclockwise direction and is released from the engagement with the valve handle gear 51.

Figure 20:
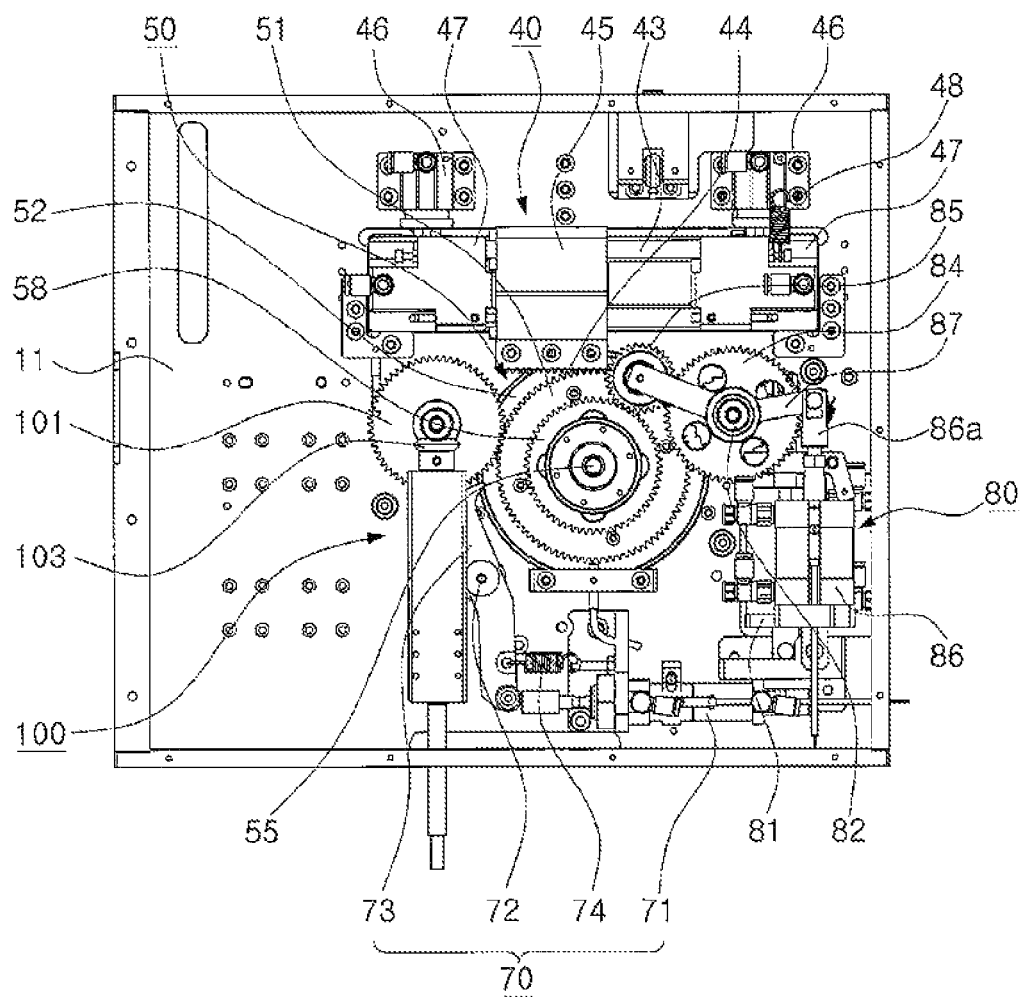
FIG. 20 is a plane view of the present invention, in which the rack moves one step so as to rotate the valve handle gear.

After that, if the rack drive actuator 46 pushes the movement piece 45, the movement piece 45 rotates the valve handle gear 51 in the counterclockwise direction while moving towards the rack drive actuator 46 at the opposite side along the guide rod 43, as shown in FIG. 20, so that the valve handle holder 52 opens the valve handle 51 while rotating by the stroke of the rack 44.

After rotating the valve handle holder 52 by moving the movement piece 45 in the operation as described above, the latch drive actuator 71 that was turned off is turned on and pushes the first latch 73 while tensioning the first elastic member 74 so that the first latch 73 is engaged with the valve handle gear 51 and then the rotation member actuator 47 is turned off. Therefore, the rotation member 42 rotates around the hinge shaft 41 by the restoring force of the third elastic member 48 and thus the engagement between the rack 44 fixed to the movement piece 45 and the valve handle gear 51 is released.

If the rack 44 is separated from the valve handle gear 51, the movement piece 45 is returned to its initial position by the drive of the rack drive actuator 46 positioned at the opposite side so that the operation as described above is repeatedly performed until the valve 63 is fully opened by the valve handle 61 of the gas barrel 60 fully opens the valve 63 (S500).

After the valve 63 of the gas barrel 60 is fully opened in the above operation, it is more preferable that the spring winding actuator 81 is re-driven so as to completely wind the spring 56 by the first shaft 55 until the sensor 88 installed on the spring winding actuator 81 of the spring winding unit 80 does not detect the piston.

At the same time, the operation of the rotation member actuator 47 is stopped and the rotation member 42 rotates around the hinge shaft 41 by the restoring force of the third elastic member 48 so that the rack 44 and the valve handle gear 51 remain separated.

Herein, the first latch 73 is engaged with the valve handle gear 51 and the second latch 92 is engaged with the second latch wheel 91 so that the spring 56 wound around the first shaft 55 is prevented from loosening.

Therefore, the valve 63 is opened from the gas barrel 60 so that the gas is stably supplied to each process through the gas spray nozzle 64 and through the connector holder 28 connected to the gas pipe 12 and the gas line.

However, in the process of opening the valve 63 from the gas barrel 60 or in the process of supplying gas through the gas line by opening the valve 63, if a natural disaster such as an earthquake occurs or a gas leak is detected by the sensor unit 140, the valve handle 61 of the gas barrel 60 must be shut off quickly so as to stop the supply of gas.

Accordingly, in the case where the sensor unit 140 detects a gas leak, the rod of the latch drive actuator 71 is pulled by the control unit so that the first latch 73 rotates around the shaft 72 so as to release the engagement state with the valve handle gear 51. In addition, in the case of a power outage, the power supply of the latch drive actuator 71 is stopped so that the first latch 73 rotates around the shaft 72 by the restoring force of the first elastic member 74 so as to release the engagement state with the valve handle gear 51.

When the first latch 73 is released from the engagement state with the valve handle gear 51 by the operation as described above, the planetary gear 85 is engaged with the spring drive gear 58 and the first shaft 55 is maintained stopped so that the spring 56 wound by the first shaft 55 is released at a high speed and rotates the valve handle holder 52 in the clockwise direction, thereby closing the valve 63 of the gas barrel 60 (S600).

Herein, if a power outage does not occur while the spring 56 is completely loosened, it is more preferable that the control units operates the valve handle opening/closing unit 40 so as to enable the rack 44 to be engaged with the valve handle gear 51 and then rotates the valve handle holder 52 in the clockwise direction in reverse operation of opening the valve 63 of the gas barrel 60, thereby completely closing the valve handle 61 of the gas barrel 60 (S700).

After automatically closing the valve handle 61 in the above operation, separating the connector holder 28 from the gas spray nozzle 64 by the gas barrel connecting portion 20 and, at the same time, screw-coupling the end cap 62, if the valve handle holder 52 is deviated from the valve handle 61 in response to the lifting of the main plate 11, the first shaft 55 is apt to rotate in the counterclockwise direction at a high speed by the spring 56 that is not fully released. However, according to the present invention, the first shaft 55 is provided with the anti-backlash means 110 such that the first shaft 55 rotates slowly until the spring 56 that is not fully released is completely released.

That is, as shown in FIG. 15, since the fixing block 112 is fixed to the top plate 111, the guide pin 114 is fitted into the fixing block 112 so that the pressing member 113 can move up and down, and, at the same time, a plurality of the fifth elastic members 115 are installed between the fixing block 112 and the pressing member 113 so as to press the spring drive gear 58, the first shaft 55 rotates slowly.

Herein, it would be understood that if the brake pad 117 is fixed to the bottom surface of the pressing member 113, then the friction force is increased such that the first shaft 55 rotates more slowly.

Meanwhile, according to the present invention, by means of the valve handle opening/closing unit 40 and the spring winding unit 80, the valve 63 of the gas barrel 60 can be automatically opened and the valve handle 61 of the gas barrel 60 can be automatically closed in case of a natural disaster or a power outage. In addition, the present invention further includes the manual opening/closing means 100 that can open/close the valve 63 of the gas barrel 60 such that the valve handle 61 can be rotated manually.

Figure 21:
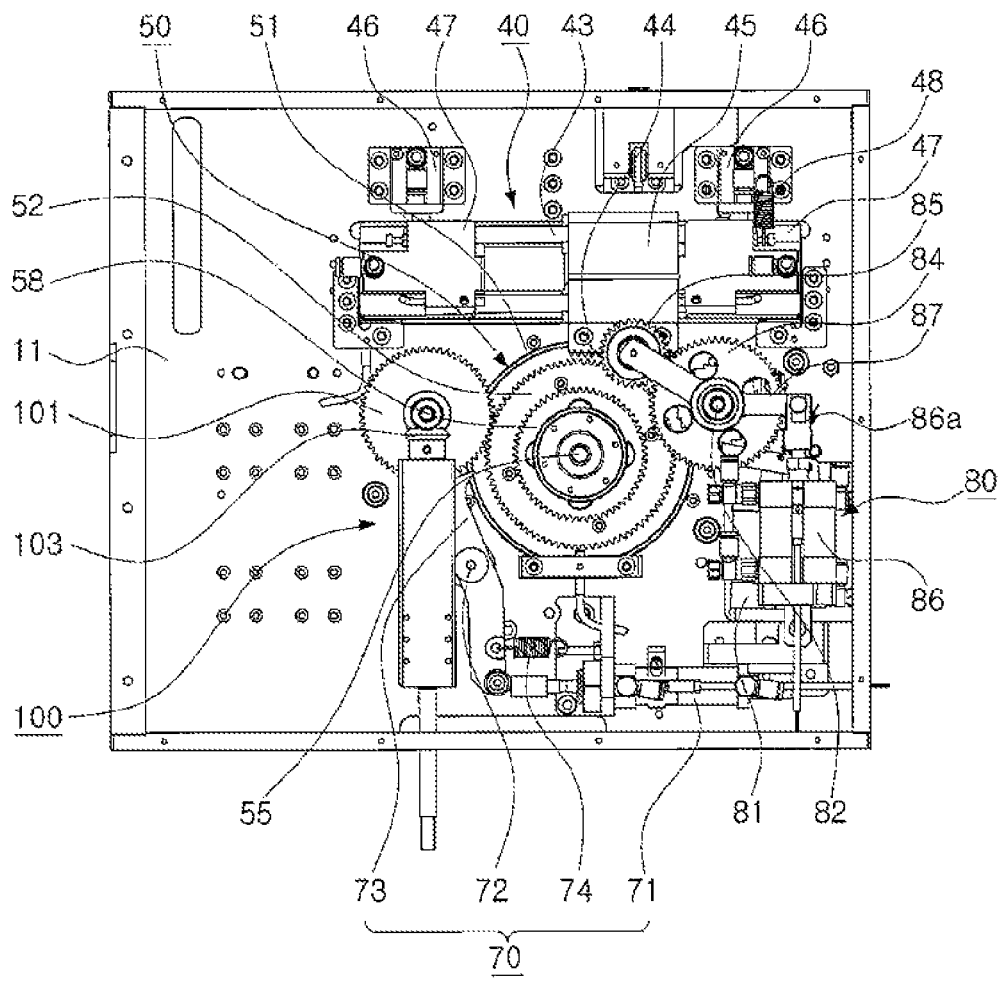
FIG. 21 is a plane view of the present invention, in which the first latch is separated from the valve handle gear and a planetary gear is separated from a spring drive gear.
Figure 22:
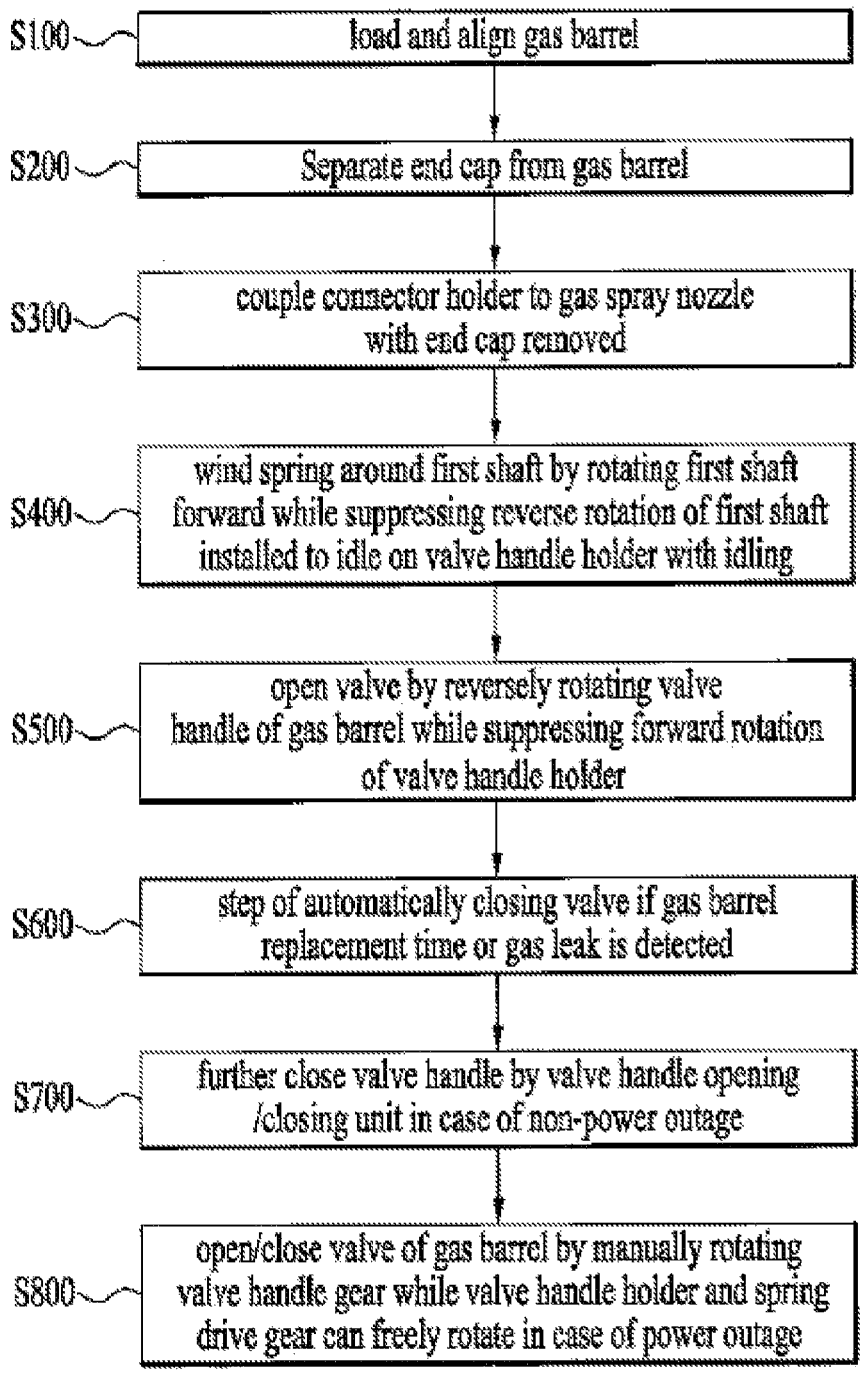
FIG. 22 is a flow chart for explaining the method of the present invention.

That is, since all the actuators 46, 47, 71, 81, 86 do not operate in response to a power outage, the first latch 73 is released from the engagement state with the valve handle gear 51, and the spring 56 is fully released, as shown in FIG. 21. Therefore, it would be understood that by rotating the manual knob 102 exposed to the outside of the main plate 11, the power is transmitted to the valve handle manual rotation gear 101 through the one pair of bevel gears that are the power transmission means 103 such that the valve handle manual rotation gear 101 can rotates the valve handle gear 51 and thus the valve 63 of the gas barrel 60 is closed (S800).

However, when the gas has been normally supplied through the gas line and it is time to replace the gas barrel 60, the used gas barrel must be replaced with a new gas barrel.

In order to replace the gas barrel 60, if the rack drive actuator 46 and the rotation member actuator 47 are actuated alternately so as to move the rack 44 of the valve handle opening/closing unit 40 in the opposite direction as described above, the valve handle holder 52 rotates in the clockwise direction so that the valve handle 61 closes the valve 63.

After the valve handle 61 closes the valve 63, since the first, second, and third actuators 22, 24, 26 operate in reverse to the above explanation, the connector holder 28 screw-coupled to the gas spray nozzle 64 is separated and, at the same time, the end cap 62 accommodated in the end cap holder 25 closes the gas spray nozzle 64 such that the replacement of the gas barrel can be implemented.

That is, when rotating the connector holder 28 in the counterclockwise direction so as to be separated from the gas spray nozzle 64 by the reverse drive of the third actuator 26, the second installation plate 23 with the third actuator 26 installed thereon is moved to the left in FIG. 8b, as much as the connector holder 28 is released, by the restoring force of the elastic member 14 fitted and compressed around the rod 24a of the second actuator 24 such that the connector holder 28 is separated from the gas spray nozzle 64, at which time the second actuator 24 is driven to move the second installation plate 23 backwards from the gas barrel 60 side.

After the connector holder 28 is separated from the gas spray nozzle 64 in the operation as described above, the first actuator 22 is driven to screw-couple the end cap 62 accommodated in the end cap holder 25 to the gas spray nozzle 64 such that the first installation plate 21 is moved to the gas spray nozzle 64 side and the end cap holder 25 and the gas spray nozzle 63 are positioned on the same axial line.

After that, the second actuator 24 is driven in reverse and, at the same time, the third actuator 26 rotates the end cap holder 25 in the clockwise direction such that the end cap 62 accommodated in the end cap holder 25 is screw-coupled to the gas spray nozzle 64 so as to be closed, thereby enabling the replacement of the gas barrel 60.

Although the embodiments of the present invention have been described above with reference to the accompanying drawings, those skilled in the art, to which the present invention belongs, would appreciate that the present invention may be embodied in other specific forms without changing the technical spirit or essential features.

Therefore, the embodiments described above are to be understood in all respects as illustrative and not restrictive, the scope of the present invention described in the above detailed description is represented by the following claims, and all changes or modifications derived from the meaning and scope of the claims and their equivalents should be construed as being included in the scope of the present invention.

What is claimed is:

1. A method for automatically opening or closing a gas barrel valve, comprising:
    loading and aligning a gas barrel in a cabinet;
    separating an end cap from the gas barrel;
    screw-coupling a connector holder to a gas spray nozzle, from which the ends cap has been removed;
    winding a spring around a first shaft by enabling forward rotation of the first shaft while suppressing reverse rotation of the first shaft, which is installed in a valve handle holder so as to idle;
    opening a valve by enabling reverse rotation of a valve handle of the gas barrel while preventing forward rotation of the valve handle holder; and
    automatically closing the valve at the time of replacement of the gas barrel or when a gas leak is detected.

2. The method of claim 1, wherein the spring is wound by the first shaft before opening the valve of the gas barrel.

3. The method of claim 1, wherein when gas is supplied from the gas barrel through a gas pipe, the gas is continuously supplied if a sensor unit does not detect a gas leak, while the suppression of the valve handle gear is released so that the valve handle is forcedly closed by the restoring force of the spring if the sensor unit detects a gas leak.

4. The method of claim 1, wherein in the case of a power outage in a state, in which the gas spray nozzle of the gas barrel is opened, the suppression of the valve handle gear is released so that the valve handle is closed by the restoring force of the spring.

5. The method of claim 3, further comprising further closing the valve handle, by a valve handle opening or closing unit, in a state, in which the spring is released and the valve handle is closed by the valve handle holder.

6. The method of claim 1, wherein in a state, in which the suppression of the valve handle gear and the spring drive gear is released so that the valve handle holder and the spring drive gear can freely rotate, the valve handle gear is manually rotated so as to close the valve of the gas barrel.

7. The method of claim 3, wherein a planetary gear is separated from the spring drive gear before the valve handle holder is separated from the valve handle.

* * * * *